(12) United States Patent
Danan

(10) Patent No.: US 7,877,749 B2
(45) Date of Patent: Jan. 25, 2011

(54) UTILIZING AND MAINTAINING DATA DEFINITIONS DURING PROCESS THREAD TRAVERSALS

(75) Inventor: Itai Danan, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 12/574,608

(22) Filed: Oct. 6, 2009

(65) Prior Publication Data

US 2010/0023537 A1  Jan. 28, 2010

Related U.S. Application Data

(63) Continuation of application No. 10/196,652, filed on Jul. 15, 2002, now abandoned.

(30) Foreign Application Priority Data

Aug. 31, 2001  (GB) .................................. 0121110.1

(51) Int. Cl.
    G06F 3/00    (2006.01)
    G06F 9/44    (2006.01)
    G06F 9/46    (2006.01)
(52) U.S. Cl. ...................... 718/100; 719/320
(58) Field of Classification Search ............ 719/320; 718/100
    See application file for complete search history.

(56) References Cited

U.S. PATENT DOCUMENTS 5,491,719 A * 2/1996 Sellin et al. ................ 375/213
5,907,640 A * 5/1999 Delean ........................ 382/276
5,987,246 A   11/1999 Thomsen et al.
6,130,676 A   10/2000 Wise et al.
6,148,336 A   11/2000 Thomas et al.
6,205,465 B1   3/2001 Schoening et al.

(Continued)

FOREIGN PATENT DOCUMENTS

EP    0283282    3/1988

(Continued)

OTHER PUBLICATIONS

British Search Report dated Jan. 14, 2002 cited in corresponding U.S. Appl. No. 10/196,671, filed Jul. 15, 2002.

(Continued)

Primary Examiner—Qing Wu
(74) Attorney, Agent, or Firm—Gates & Cooper LLP

(57) ABSTRACT

A method, apparatus, and article of manufacture for traversing a process tree in a digital video editing system. A process tree is loaded into a digital video-editing system. The process tree has parent nodes that are dependent on output data from child nodes. Each parent node and each child node represents a digital video processing task to be performed during a traversal of the process tree. Each parent node declares a data definition and data default values. The data definition defines a structure of the data used by that parent node. For each parent node processed, a determination is made regarding whether the data definition for the output data received from a dependent child node is compatible with the data definition declared for that parent node. If the data definition is incompatible, the parent node utilizes the data default values.

6 Claims, 24 Drawing Sheets

U.S. PATENT DOCUMENTS

| | | |
|---|---|---|
| 6,304,891 B1 | 10/2001 | Anderson et al. |
| 6,430,590 B1 | 8/2002 | Fischer |
| 6,505,228 B1 | 1/2003 | Schoening et al. |
| 6,546,365 B1 | 4/2003 | Gajda et al. |
| 6,668,254 B2 | 12/2003 | Matson et al. |
| 6,854,116 B1 | 2/2005 | Anderson et al. |
| 6,904,595 B2 | 6/2005 | Alford et al. |
| 6,951,019 B1 | 9/2005 | Anderson et al. |
| 6,961,934 B2 | 11/2005 | Alford et al. |
| 2004/0268350 A1 | 12/2004 | Welland et al. |
| 2005/0210473 A1 | 9/2005 | Inchingolo et al. |

FOREIGN PATENT DOCUMENTS

| | | |
|---|---|---|
| EP | 0304880 | 3/1989 |
| EP | 0801492 | 10/1997 |
| EP | 1227411 | 7/2002 |
| GB | 1516369 | 10/1976 |
| GB | 2296797 | 7/1996 |
| GB | 2363017 | 12/2001 |
| JP | 03121552 | 5/1991 |
| JP | 06259115 | 9/1994 |
| JP | 09198518 | 7/1997 |
| JP | 10247142 | 9/1998 |
| JP | 10320240 | 12/1998 |
| JP | 11110227 | 4/1999 |
| JP | 2000076157 | 3/2000 |
| JP | 20000194609 | 7/2000 |
| JP | 2002351677 | 12/2002 |
| WO | 94/22101 | 9/1994 |

OTHER PUBLICATIONS

Any Spreadsheet with functions, e.g., Microsoft Excel, See Running Microsoft Excel; Dodge, Kinata, Stinson; ISBN 1-55615-585-9, 1994, p. 118 showing nested formulae and p. 415 showing a formula with dependencies operating on ranges.

* cited by examiner

```
// Filename: module.cpp include <database.h>
include <initialise.h>
#include <process.h>
#include <cache.h>
#include <continuation.h>
#include "module.h"
                                    601
Static objects
   InInit<module> _instance;   //registration object Constructor for registration object
   InInit<module>::InInit () {   602
                                                603
Registering Dependencies
   addDependency(InInit<database>::getType());
   RegisterDependency(typeInfo(InInit<initialize>).typeID());
   RegisterDependency(typeInfo(InInit<process>).typeID());
   RegisterDependency(typeInfo(InInit<cache>).typeID());
   RegisterDependency(typeInfo(InInit<continuation>).typeID());

604              605    606   607
Registering Context
   addContext(InInit<process>:: getType(context, slot, value));
}
   Module() { // the rest of the main function goes here f(Context)     609
  608    F(Cache)       610
         F(Continuation)   611
         }

// Other functions, including initialise() and finalise()

Module initialisation and finalisation functions
   InInit<module>::performInitialise()   612
   {
   // whatever initialisation this module requires
   } void InInit<module>::performFinalize()   613
   {
   // whatever finalisation this module requires
   }

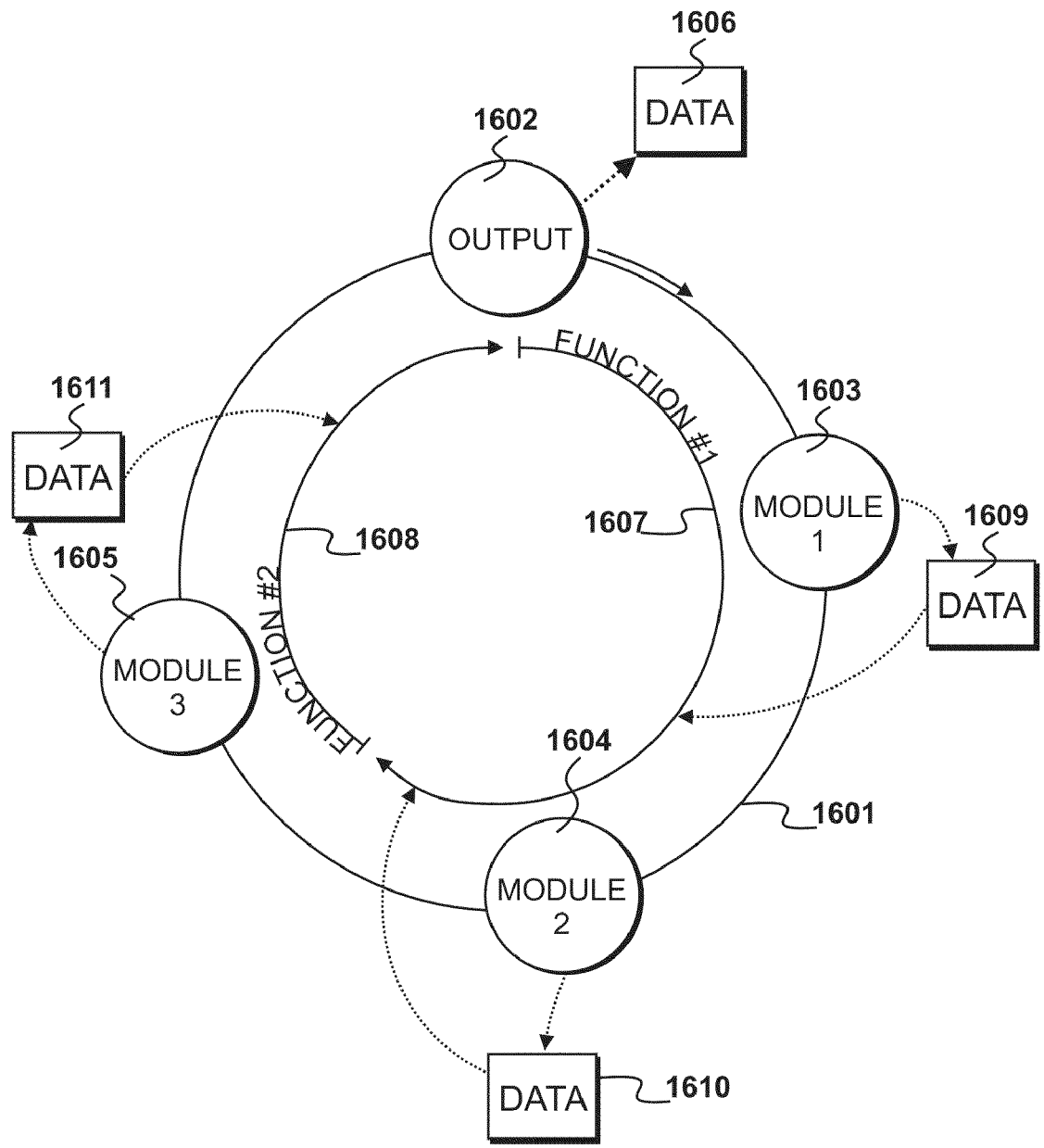
[PRIOR ART] *Figure 16*

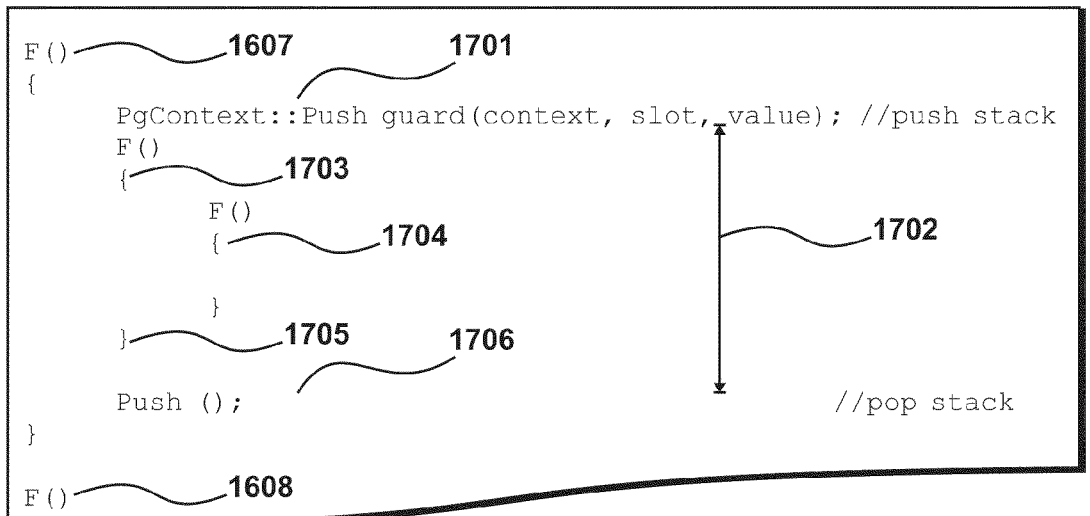
Figure 17 [PRIOR ART]
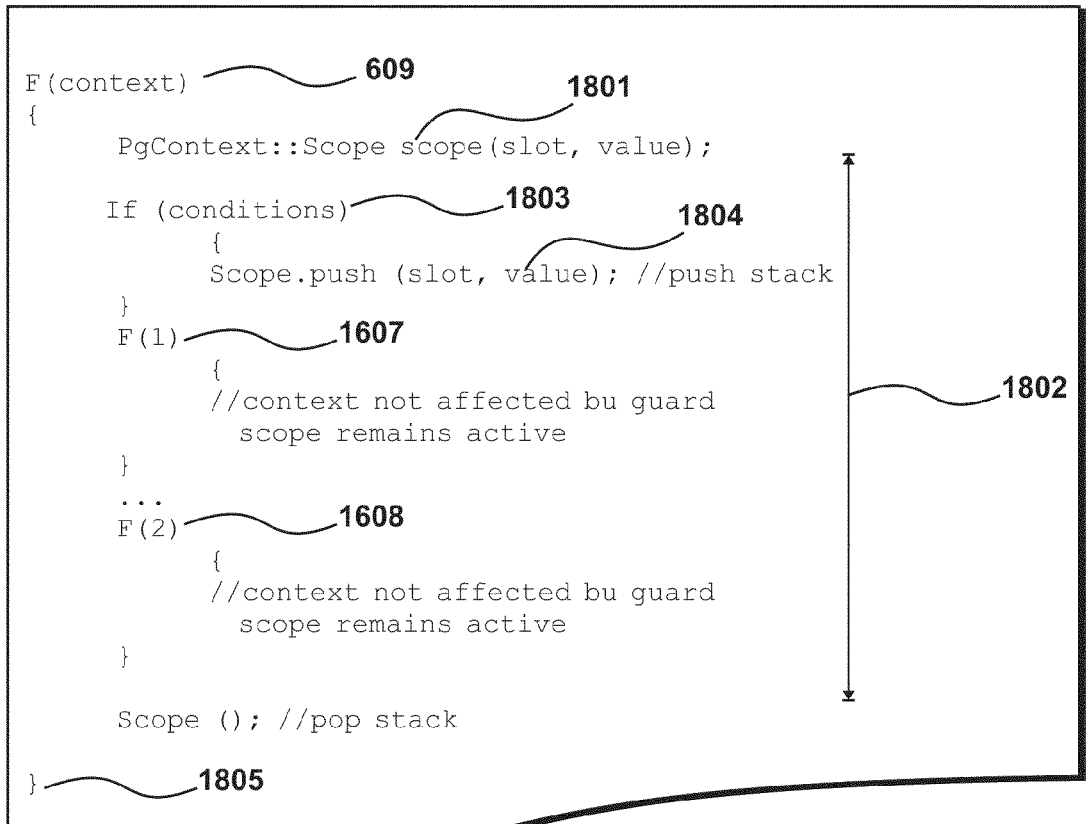
Figure 18

UTILIZING AND MAINTAINING DATA DEFINITIONS DURING PROCESS THREAD TRAVERSALS

CROSS-REFERENCE TO RELATED APPLICATIONS

This application is a continuation of and claims the benefit under 35 U.S.C. Section 120 of the following co-pending and commonly-assigned U.S. utility patent application(s), which is/are incorporated by reference herein:

Utility application Ser. No. 10/196,652, filed Jul. 15, 2002, abandoned and no longer copending, by Itai Danan, entitled "PROCESSING IMAGE DATA", which application claimed the benefit under 35 U.S.C. §119 of the following co-pending and commonly assigned foreign patent application, which application is incorporated by reference herein: United Kingdom Patent Application No. 01 21 110.1, entitled "PROCESSING DATA", filed on Aug. 31, 2001.

This application is related to the following co-pending and commonly-assigned patent application, which application is incorporated by reference herein:

U.S. patent application Ser. No. 10/196,671, now U.S. Pat. No. 7,155,719 issued on Dec. 26, 2006, entitled "CONTINUATION MANAGER", by Itai Danan, filed on Jul. 15, 2002;

BACKGROUND OF THE INVENTION

1. Field of the Invention

The present invention relates to initialising and maintaining a structure referencing data during execution of an application running on a computer.

2. Description of the Related Art

The speed and capacity of processing and data storage devices has gradually shifted the limits of application functionality from hardware to application instructions themselves.

The increasing complexity of many applications is such that it is no longer possible to consider a set of application instructions as ever being finished. Instead, the source code for these instructions evolves over time, and improves according to changing user requirements over a product lifetime spanning many years. Even in the shorter term, application instructions may change from day to day. In order to manage this constant evolution and minimise the problems arising from its inherent complexity, it is established good engineering practice for applications to comprise a large number of small sets of instructions or modules.

Individual teams of engineers can work on modules separately, and this enables parallel evolution of several aspects of an application's functionality. Theoretically, any complex application can be broken down into sufficiently small individual modules so that complexity, at the module level, never becomes a limiting factor. However, as the number of said modules increases, the problem of combining them to work together becomes more difficult. In the art, it is this problem which places an upper limit on the complexity of reliable application evolution.

A fundamental difficulty when combining modules in an application, is the initialisation of the data said modules provide a specific functionality for the processing thereof. A main application may comprise tens or even hundreds of said modules, and should any of said modules fail to initialise and/or process data generated by another of said modules, this may generate a corruption of the output data or even a main application crash.

The initialisation has to occur before the main application processing begins and, in the case of dynamically loaded modules known in the art as 'plug-ins', said initialisation often has to occur during said main application processing. In order to avoid this problem, engineers traditionally have to keep application complexity as low as possible, while still fulfilling the application requirements, and thus there exists a limit to the creativity with which engineers may devise new or improved modules for a main application.

A further problem encountered by individual teams of engineers is that they traditionally have to implement their expertise in an application by using the application's specific Application Programming Interface (API). The equipping of numerous different applications with the same specialist functionality can prove expensive and time-consuming, as said specialist functionality must be modified for implementation according to every different API.

In certain environments, such as video editing, application size and complexity cannot be avoided, and so it is possible for very significant and costly difficulties to occur, when attempting to process input data by means of said modules to generate an output, such as a video sequence or composite image.

A need therefore exists for allowing an application to benefit from a combination of modules developed under differing APIs without however compromising the overall functionality of said application due to the corruption of any of said modules' output.

SUMMARY OF THE INVENTION

It is an object of the present invention to provide an improved method of initialising and maintaining a register of data definitions in an application comprising a large number of application modules.

According to an aspect of the invention, there is provided a method of processing data including a plurality of processes, wherein a first process supplies data of a predetermined type to a second process, wherein said second process stores type data identifying the type of data it expects to receive from said first process and said second process is configured to modify its output if the data which is received from said first process differs from said stored data type.

In a preferred embodiment of the present invention, each of said first and second processes stores said type data and default values thereof within a data type register. Preferably, each of said first and second processes accesses said data type register according to said dependencies by means of a process thread.

In a preferred embodiment of the present invention, each of said first and second processes stores actual data in said data type register by means of said process thread. Preferably, said second processes modifies its output with processing said stored default data if said stored actual data of said first process cannot be processed at said second process.

In a preferred embodiment of the present invention, the respective functionality of each of said plurality of processes are invoked by means of a task processing sequence. Preferably, said sequence is processed by said process thread and said task-processing sequence defines child and parent processes, the output data of said parent processes being dependent upon the output data of their respective children processes.

In a preferred embodiment of the present invention, the output data of each of said plurality of processes comprises either processed actual data or processed default data or a combination thereof.

In the preferred embodiment of the present invention, a single processing pipeline is thus defined by said process thread.

According to another aspect of the invention, there is provided an apparatus configured to process data, comprising display means configured to display a plurality of processes equipped with dependencies, storage means configured to store said plurality of processes equipped with dependencies. Said processing means is configured by said plurality of processes equipped with dependencies to perform the processing steps of supplying data of a predetermined type to a second process at a first of said plurality of processes; accessing type data identifying the type of data it expects to receive from said first process at said second process of said plurality of processes; and modifying its output if the data which is received from said first process differs from said accessed data type at said second process.

According to yet another aspect of the invention, there is provided a computer system programmed to process data, including a plurality of processes equipped with dependencies, programmed to perform the processing steps of supplying data of a predetermined type to a second process at a first of said plurality of processes; accessing type data identifying the type of data it expects to receive from said first process at said second process of said plurality of processes; and modifying its output if the data which is received from said first process differs from said accessed data type at said second process.

According to yet another aspect of the invention still, there is provided a computer readable medium having computer readable instructions executable by a computer, such that said computer performs the steps of supplying data of a predetermined type to a second process at a first of said plurality of processes; accessing type data identifying the type of data it expects to receive from said first process at said second process of said plurality of processes; and modifying its output if the data which is received from said first process differs from said accessed data type at said second process.

BRIEF DESCRIPTION OF THE DRAWINGS

FIG. 6 shows an edited example of the source code for a processing module of FIG. 5, according to the invention;

FIG. 16 provides a graphical representation of a multiple processing pipeline generated by a processing cycle according to the prior art;

FIG. 17 shows an edited example of the source code for a context function invoked by a processing module shown in FIG. 16, according to the prior art;

FIG. 18 shows the source code of FIG. 17 modified according to the invention;

DETAILED DESCRIPTION OF THE PREFERRED EMBODIMENTS

The invention will now be described by way of example only with reference to the previously identified drawings.

FIG. 1

Most modern data-processing applications, whether generic such as word processors and spreadsheet applications or very specific such as digital video editing applications, undergo daily evolution, through modification and/or improvement of their numerous function-specific modules, also known to those skilled in the art as 'plug-ins'.

It is well known in the art for individual teams of engineers, who are totally removed from the company producing a specific application, to create new- or modify existing function-specific modules in order to improve said application's functionality, thus enhancing any of such generic or specific applications with said engineers' own particular expertise. An example would be an engineer specialising in three-dimensional motion tracking technology, who prefers to confer its technological expertise to most applications requiring said motion tracking functionality, such as image compositing, virtual worlds modelling or avatar animating, rather than any specific compositing application in particular.

Figure 1:
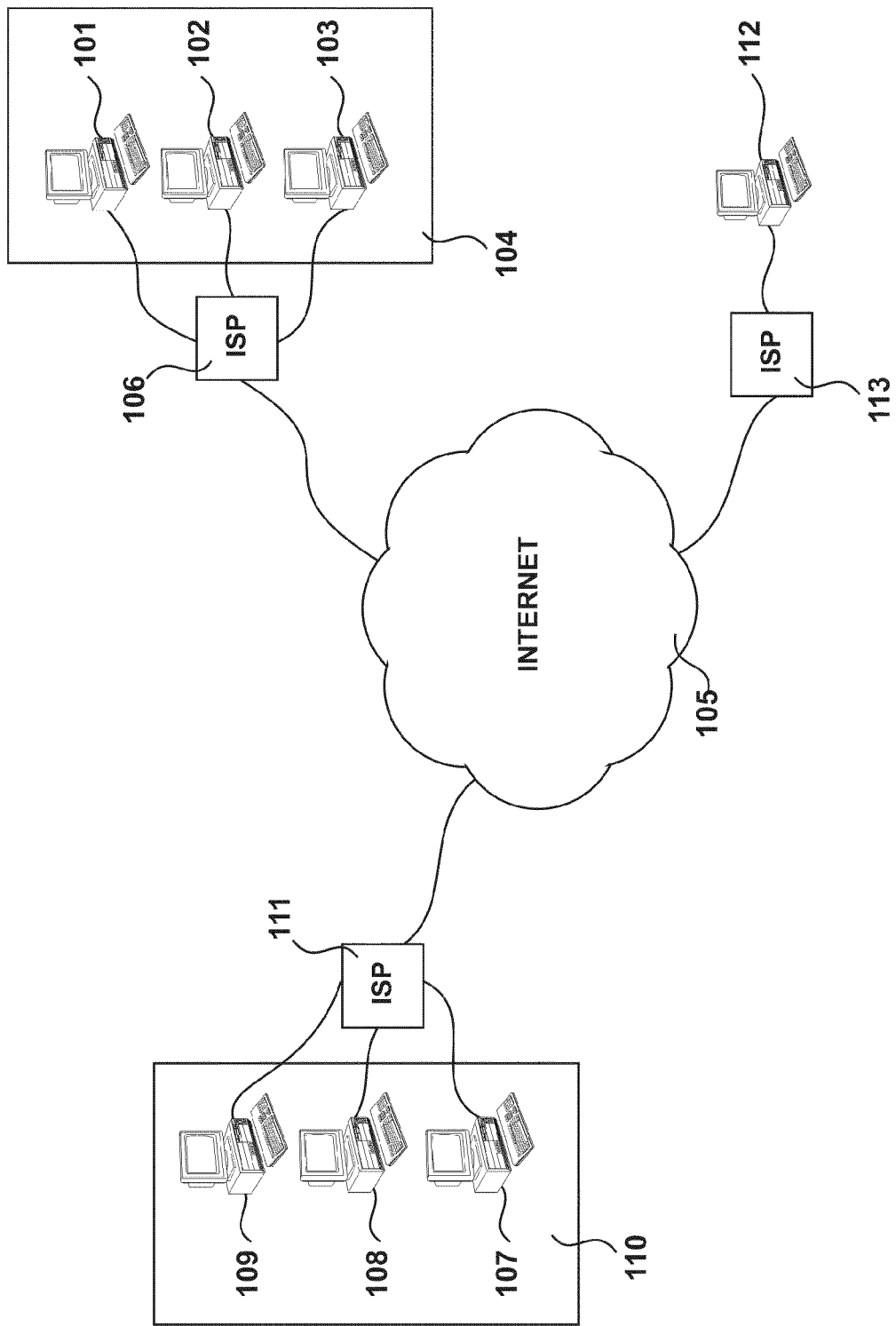
FIG. 1 shows a network for connecting multiple user terminals.

Most engineers distribute plug-ins over networks such as the Internet, as numerous iterations of said plug-ins are traditionally circulated for testing and debugging prior to commercial release amongst multiple users using a network of connected computers. An environment for connecting multiple users to whom plug-ins will be distributed is illustrated in FIG. 1.

Computer terminals 101, 102 and 103 are image processing systems located at an image compositing company 104 and are connected to the Internet 105 via an Internet Service Provider (ISP) 106.

Computer terminals 107, 108 and 109 are image processing systems located at a different image compositing company 110 and are also connected to the Internet 105 via an Internet Service Provider (ISP) 111.

Computer terminal 112 is connected to the Internet 105 via an Internet service provider (ISP) 113 and is operated by a third-party engineer as described above.

The ISPs 106, 111 and 113 in combination with user terminals 101 to 111, provide each individual user with a unique IP address, e-mail account and other optional Internet facilities such as are commonly provided to a user with an ISP account. Provided that appropriate data transfer applications, protocols and permissions have been set up, there is provided the scope for terminals 101, 102 and 103 and terminals 107, 108 and 109 to access data stored on terminal 112.

FIG. 2

Figure 2:
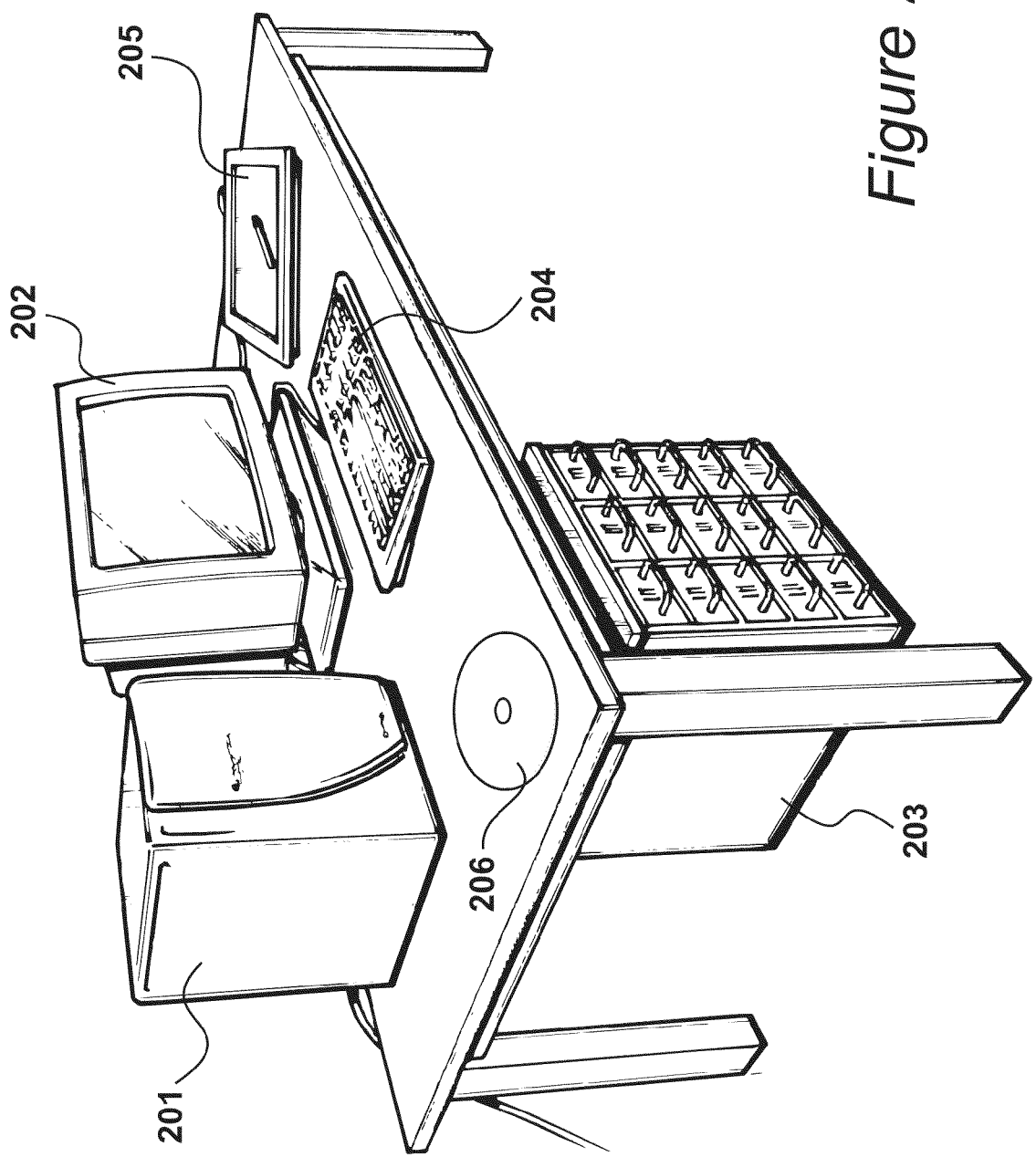
FIG. 2 shows a networked user terminal as shown in FIG. 1 in further detail, as an image processing system.

An image processing system such as terminal 101 is illustrated in FIG. 2. A processing system 201, such as an Octane™ produced by Silicon Graphics Inc., supplies image signals to a video display unit 202. Moving image data is stored on a redundant array of inexpensive discs (RAID) 203. The RAID is configured in such a way as to store a large volume of data, and to supply this data at a high bandwidth, when required, to the processing system 201. The operator controls the processing environment formed by the processing system 201, the video monitor 202 and the RAID 203, by means of a keyboard 204, and a stylus-operated graphics tablet 205. The processing system shown in FIG. 2 is optimal for the purpose of processing image and other high bandwidth data. In such a system, the instructions for controlling the processing system are complex. The invention relates to any computer system where processing instructions are of significant complexity.

Instructions controlling the processing system 201 may be installed from a physical medium such as a CDROM or DVD disk 206, or over a network, including the Internet. These instructions enable the processing system 201 to interpret user commands from the keyboard 204 and the graphics tablet 205, such that image data, and other data, may be viewed, edited and processed.

FIG. 3

Figure 3:
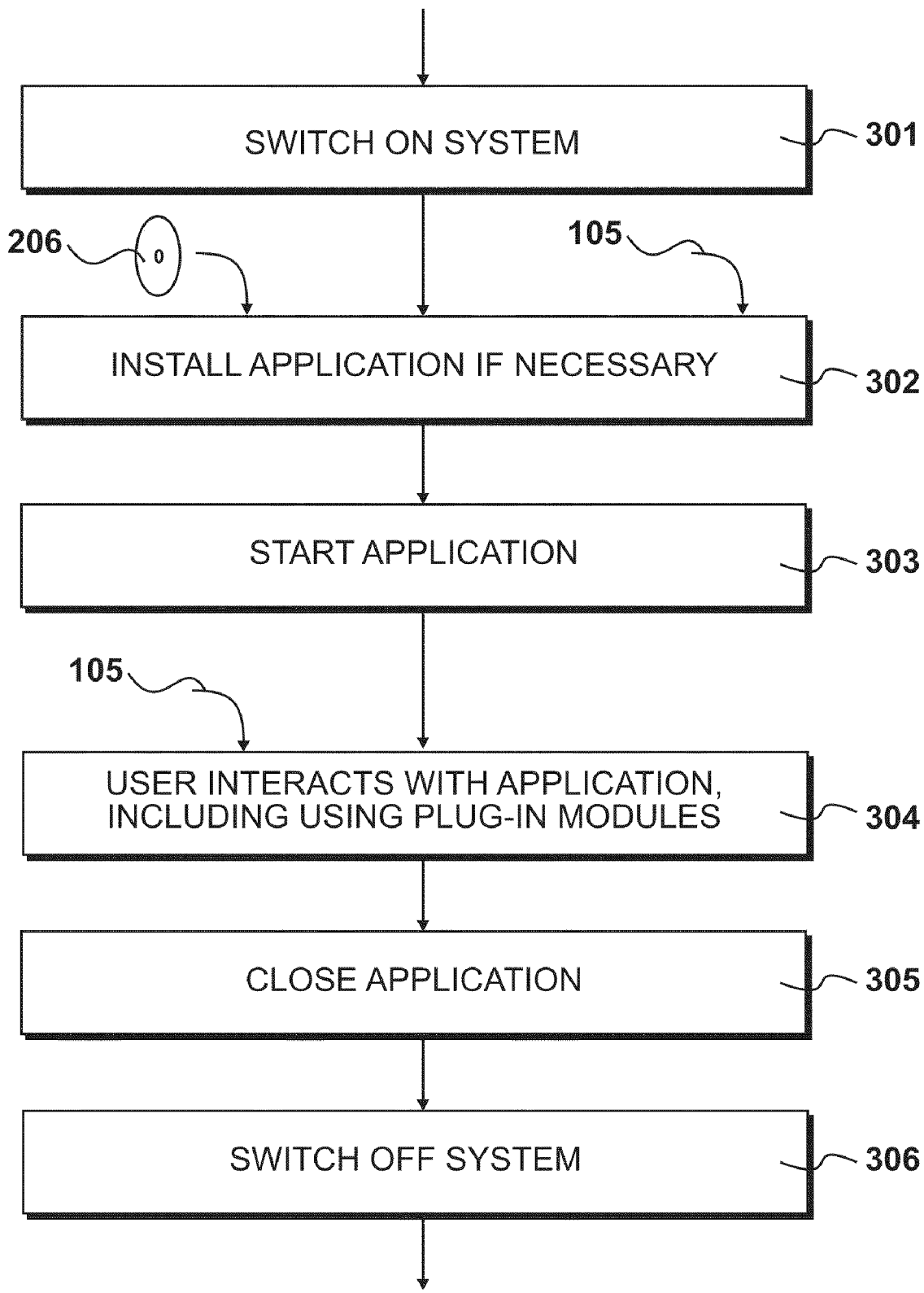
FIG. 3 details the operational steps according to which a user operates the image processing system of FIG. 2.

User operations of the system shown in FIG. 2 are summarised in FIG. 3. At step 301 the user switches on the computer system. At step 302 application instructions for controlling the processing system 201 are installed if necessary. These instructions may be installed from a CDROM or DVD 206, or via a network, possibly the Internet 105. At step 303 the user interacts with the processing system 201 in such a way as to start the application instructions. At step 304 the user interacts with the application now running on the processing system 201. These interactions include the loading and saving of files.

Files of various formats may be loaded and saved. Each file format has a specific set of instructions for loading and saving. Where a large number of formats are to be loaded and saved, instructions for all formats are not loaded simultaneously. Instead, instructions for format loading and/or saving are only loaded when the user initiates an action that explicitly requires them. Instructions of this kind are sometimes referred to as plug-ins, reflecting the fact that a user can obtain such instructions and make them available to the main application according to his or her specific needs.

Plug-ins may provide a broad variety of functionality. In image processing, various types of image filtering, enhancement and modification can be performed by algorithms available as plug-ins. Furthermore, the main application instructions and additional plug-ins need not be written by the same engineer who wrote the main application. According to the prior art, they merely need to conform to the application's standard application programming interface.

At step 305 the user closes the application, and at step 306 the processing system 201 is switched off.

FIG. 4

Figure 4:
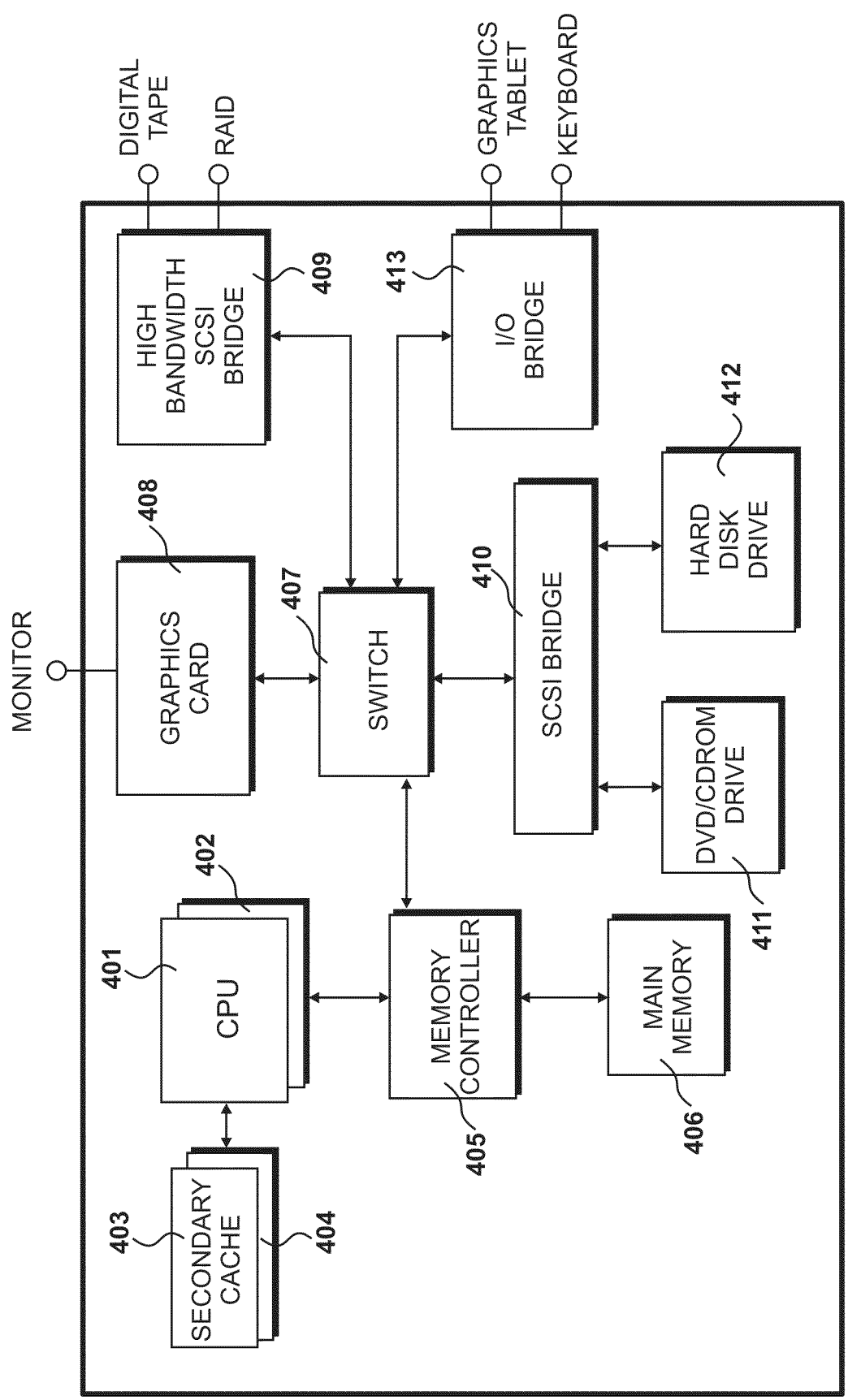
FIG. 4 details the hardware components of the image processing system of FIG. 2 in further detail.

The processing system 201 shown in FIG. 2 is detailed in FIG. 4. The processing system comprises two central processing units 401 and 402 operating in parallel. Each of these processors is a MIPS R12000 manufactured by MIPS Technologies Incorporated, of Mountain View, Calif. Each of these processors 401 and 402 has a dedicated secondary cache memory 403 and 404 that facilitate per-CPU storage of frequently used instructions and data. Each CPU 401 and 402 further includes separate primary instruction and data cache memory circuits on the same chip, thereby facilitating a further level of processing improvement. A memory controller 405 provides a common connection between the processors 401 and 402 and a main memory 406. The main memory 406 comprises two gigabytes of dynamic RAM.

The memory controller 405 further facilitates connectivity between the aforementioned components of the processing system 201 and a high bandwidth non-blocking crossbar switch 407. The switch makes it possible to provide a direct high capacity connection between any of several attached circuits. These include a graphics card 408. The graphics card 408 generally receives instructions from the processors 401 and 402 to perform various types of graphical image rendering processes, resulting in images, clips and scenes being rendered in real time on the monitor 202. A high bandwidth SCSI bridge 409 provides an interface to the RAID 203, and also, optionally, to a digital tape device, for use as backup.

A second SCSI bridge 410 facilitates connection between the crossbar switch 407 and a DVD/CDROM drive 411. The DVD drive provides a convenient way of receiving large quantities of instructions and data, and is typically used to install instructions for the processing system 201 onto a hard disk drive 412. Once installed, instructions located on the hard disk drive 412 may be fetched into main memory 406 and then executed by the processors 401 and 402. An input output (I/O) bridge 413 provides an interface for the graphics tablet 205 and the keyboard 204, through which the user is able to provide instructions to the processing system 201.

Application instructions running on the processing system 201 are complex. Whether the application is a word processor, image editor or a digital film editor, the instructions that define the application's functionality typically run into hundreds of thousands, if not several millions, of individual binary instructions for the processors 401 and 402. Definition of these instructions is achieved by the use of a high level language such as C++, which is compiled into binary machine code compatible with the intended target processor. However, the use of a high level language, while reducing the effort required to define instructions, still does not solve the complexity problem entirely. As high level languages have become more sophisticated, this has allowed engineers to create more complex applications. The requirement of organisation still imposes a limit upon the complexity that application instructions can achieve. This complexity is minimised by splitting up an application into a large number of modules.

FIG. 5

Figure 5:
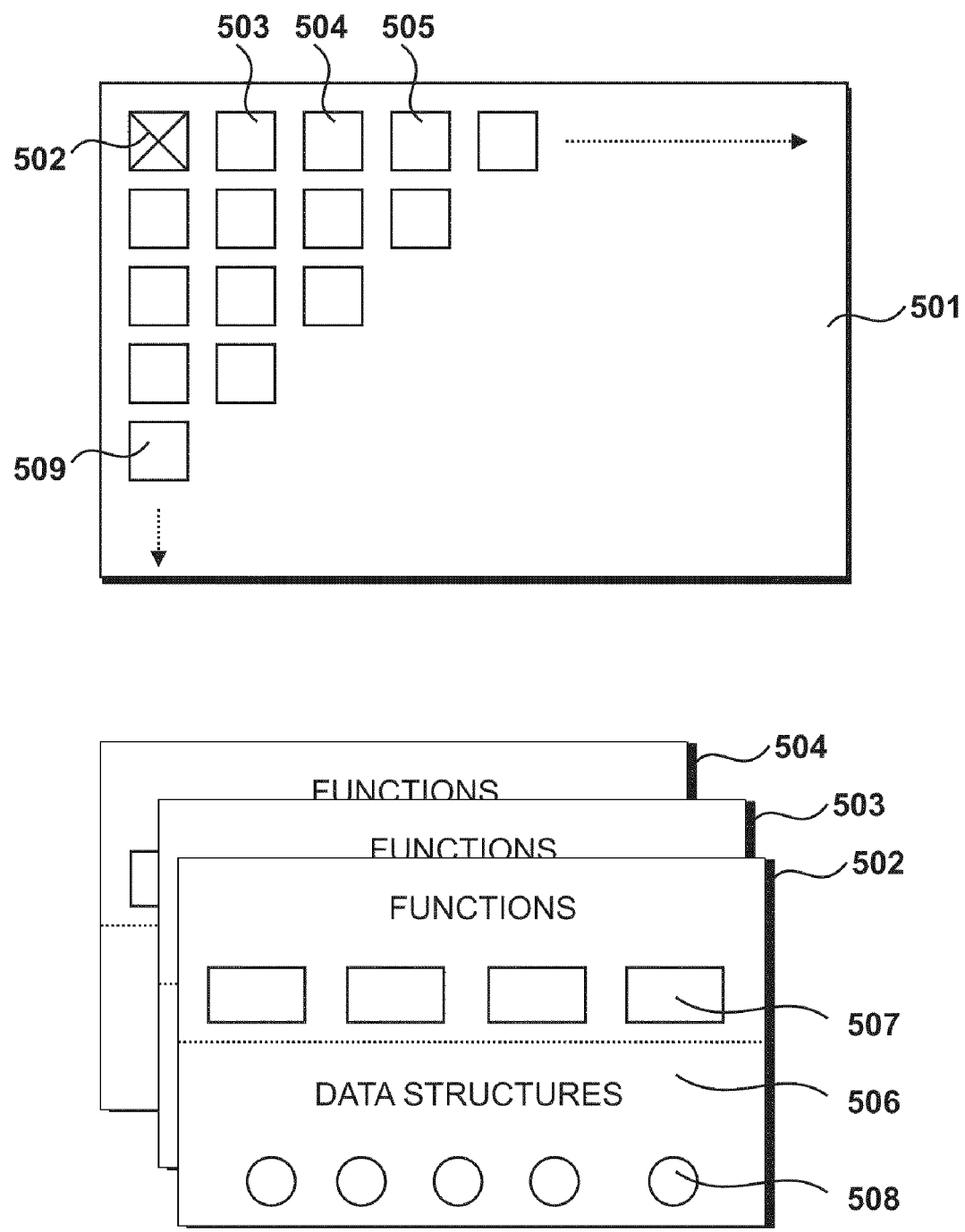
FIG. 5 shows an example of the relationships existing between the various processing modules of an application run by the image processing system as detained in FIG. 4.

A particular difficulty encountered when combining modules in a single application is that of module compatibility. In FIG. 5, an illustration is shown of the relationships between modules that lead to this difficulty. An application 501 comprises an executable module 502 and several other modules 503 to 505. The modules 502 to 505 are dynamically loaded shared objects. Under Unix-type operating systems, such as Irix™ and Linux™, dynamically shared objects are usually abbreviated as dso's. They are also known simply as shared objects. Under Windows™ operating systems, dso's are known as dynamically loaded libraries, or dll's. The executable module 503 defines the starting point of the application instructions 501, while the other modules 502 to 505 provide additional functionality that is invoked via the executable 502.

Each module 502 to 505 includes instructions 506, in the form of several functions 507, and data structures 508. There are two types of data that it is necessary to consider. The first type of data is user data, supplied usually from files on the hard disk 412, and which is to be created, manipulated and stored by the application. User data includes word processing files, text files, image files and so on. However, from an engineer's perspective a second type of data exists, which has an effect on the behaviour of the application, and the functions 507 within each module. These types of data are indicated at 508.

An example of this type of data is a mathematical function which is required to calculate a sine function at high speed. A look up table includes a number of pre-calculated results, thus reducing significantly the time required for the function to execute. Thus a data structure affects a function in a module. In some implementations the data structure is created when the application starts, by invoking an initialisation function prior to the start of the main application. In order for the application to function correctly, it is essential for the sine function to be initialised before the application begins. This is an example where data structures 508 within modules must be initialised.

A second requirement for initialisation is when hardware components of the processing system 201 are to be initialised. For example, the graphics card 408 has the potential to operate in a variety of display modes. The application may require a particular mode to operate. In order to do this, a graphics interface module 509 can be used to interrogate the graphics card 408 and determine which of its available modes is suitable for the application. The graphics card is then instructed to operate in the selected mode. Thereafter, many other modules will require information about the selected graphics mode in order to function correctly within the overall context of the application. This is an example of a requirement for hardware initialisation, which also results in data structures being initialised, that represent the behaviour and characteristics of the graphics card so that other modules may function in an appropriate way.

Various types of modules require initialisation, although it is possible that some modules will require none.

FIG. 6

An edited example of the source code for a module 502 which requires initialisation at the start of an application is shown in FIG. 6 according to the invention. The source code is written in C++, but defines the actions of events that occur during the loading of the module which may be implemented in binary process instructions or any other appropriate instruction medium, and which may be stored on a hard disk drive 412, optical disk 206, or transferred as a stream over a network 105 to facilitate an initialisation process. Moreover, the example in FIG. 6 is heavily edited to convey the essence of the invention. Proper engineering practice known to those skilled in the art will result in these features being placed in several files, including header files, and a source code file dedicated to initialisation functionality alone, as will be appreciated by those skilled in the art.

In the source code listing, a registration object is declared at 601. Because this is declared outside any function or other type of structure, it is static, i.e. it exists from the time the module is loaded to the time the module is unloaded. At 602, a constructor for the template class invoked at 601 is defined. The constructor for a static object is called automatically by the loading process within step 303. Thus, even before the main application starts, the constructor for each module is called. Any instructions may be placed here in order to define the functionality of the registration object declared at 601.

An addDependency( ) function is called at 603, the arguments of which are contained in brackets and define an additional dependency for the present module. The constructor shown in this example has four lines of code, each defining a dependency. Thus, as a result of executing these four lines of code, an entry will have been processed with the meaning that the present module is dependent upon modules initialise, process, cache and continuation.

In order to implement the invention, a second function addContext( ) is called at 604. Its argument, contained in brackets, defines an additional slot 606 including one or a plurality of default values 607 in a data definition register 605 administered by the process module and further defines a comparison function to define the equality of values 607 within the slot 606. The constructor shown in this example has one line of code declaring the register 605 within which the functionality of the present module will be called, the slot 606 within the context 605 within which the definition of the present modules data is declared and finally, the values 607 within said slot 606 which represents a set of default values of the output type when the functionality of the present module is invoked.

The operational functions of the example module 502 are subsequently declared at 608, which define the purpose of said present module upon completing the application start process of step 303. In the particular case of the executable module 502, a context object 609, cache object 610 and continuation object 611 are declared amongst said other dynamic functions and each defines a thread concurrently processed by processes 401 and 402 whilst a user interacts with the application at step 304.

For completeness in this example, code is also shown for the performInitialise( ) 612 and performFinalise( ) 613. According to the present invention, only the executable module 502 needs to declare dynamic functions 609, 610 and 611, whereas all other modules need to register a static register object 604 equipped with a register 605, slot 606 and values 607 and declare a context object 609.

FIG. 7

Figure 7:
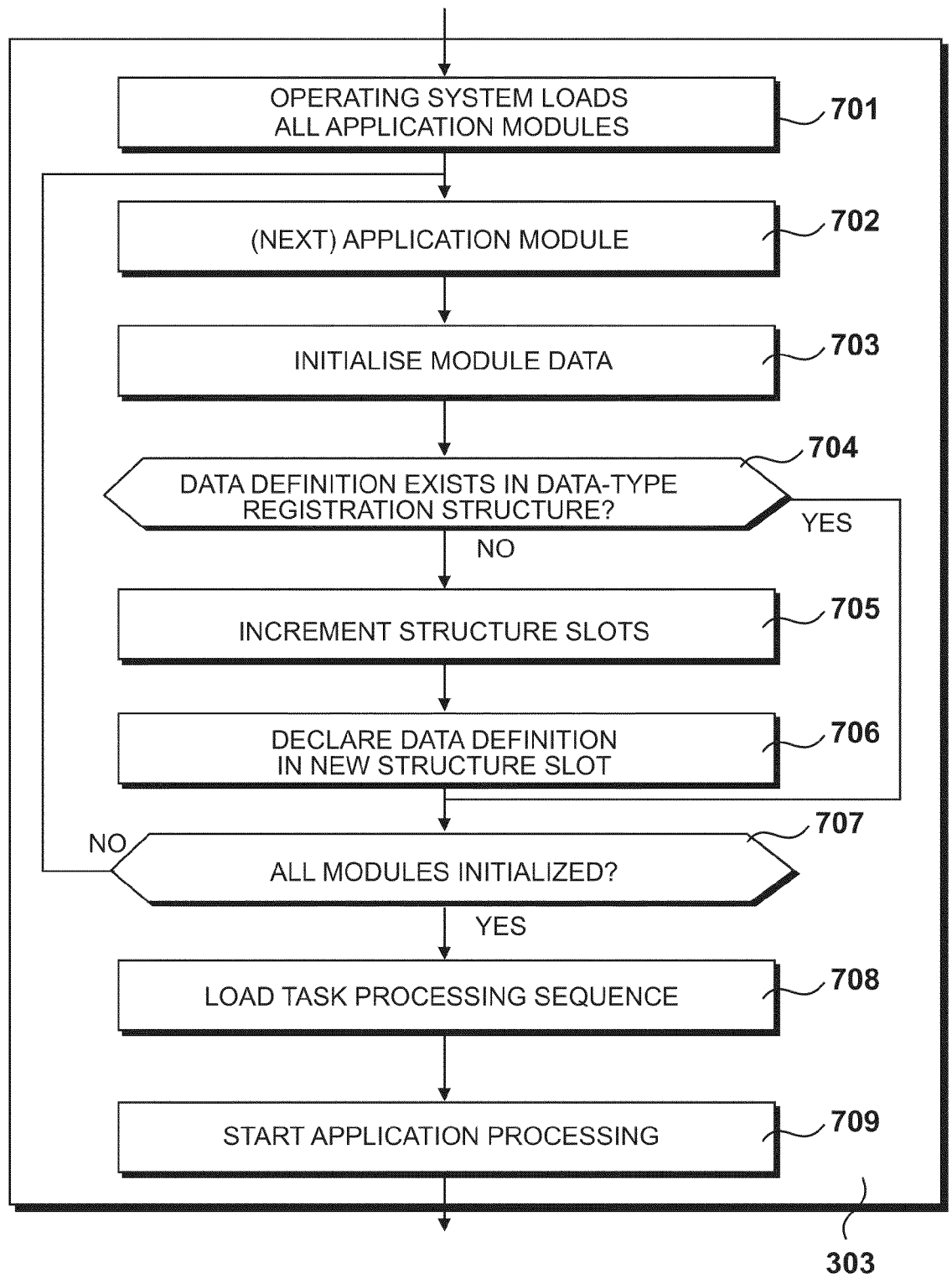
FIG. 7 shows the process of starting an application, including the modules detailed in FIGS. 5 and 6, according to the invention.

The application start process of step 303 is further detailed in FIG. 7, wherein the data definition register of the present invention is generated. At step 701, an operating system running on the processing system 201 performs loading of all application modules. As a result of this process, each module is registered in a list, along with its dependencies which are processed and validated. According to the teachings of copending British patent application No. 01 08 953.1 in the name of the present Assignee, which are incorporated herein for reference, an initialisation schedule is generated by sorting the modules in order of the number of their dependencies, according to which said modules are subsequently sequentially initialised. Thus, at step 702, the first module in the initialisation schedule is selected. When step 702 is first encountered, the executable module 702 is loaded and, at step 703, the initialisation function 612 is called for the selected module. This has the result that the data 508 in the module, upon which correct module functionality depends, is initialised before other modules attempt to use the operational functions 507, 608. As a result of the initialisation function 612, every module's static objects are declared, their dependencies registered (603) and the module's register 605, data definition 606 and default values 607 thereof declared (604) and registered (609).

At step 704, a question is asked as to whether the data definition the present module seeks to register already exists in the data definition register. When the first executable module 502 is initialised, there obviously exist no data definition register as yet and thus, the question asked a step 704 is answered negatively, whereby the data definition register is first generated, its data definition slot is incremented by a unit at step 705 and the data definition 606 and default values 607 thereof are declared within the data definition register at step 706.

As more modules are initialised after the executable module 502, some of said subsequently initialised modules may perform various distinct functions on identically structured data. For example, a module engineered to provide a particularly fast method of previewing a three dimensional model composed of polygons will process the same data as another module specifically engineered to provide a particularly realistic method of equipping the polygons of said three dimensional model with a texture, i.e. polygons. Thus, question 704 may also be answered positively, at which point control is directed to the next step 707.

At said step 707, a question is asked as to whether all the modules listed in the initialisation schedule have been initialised. Until all of said modules have been initialised, the question 707 is answered negatively, wherein control is returned to step 702 and the next application module in the initialisation schedule is initialised. Question 707 is eventually answered positively and, at step 708 a task processing sequence is loaded in main memory 406. Said task processing sequence is a data structure which details which specific modules loaded at step 701 and initialised at step 702 through to step 707 should be invoked and in which particular order so that the application loaded at step 302 and started at step 303 can provide the user's intended output.

For example, if the application is a database, the task processing sequence loaded at step 708 may comprise a report comprising data-mining and data-compiling queries consisting mainly of SQL statements. Accordingly, modules of the database application such as a boolean search module and a mathematical functions module would be invoked in order to firstly identify the relevant alpha-numerical data contained within the tables of said database, and subsequently process values of said alpha-numerical data with mathematical functions.

Alternatively, in the specialist field of digital video editing, the task processing sequence loaded at step 708 may be an edit decision list, also known to those skilled in the art as a process tree, which represents image or audio data processing tasks to be performed in a logical order in order to generate a composited frame or even a complete video sequence.

Upon performing the task processing sequence loading of step 708, the application processing starts at step 709.

FIG. 8

Figure 8:
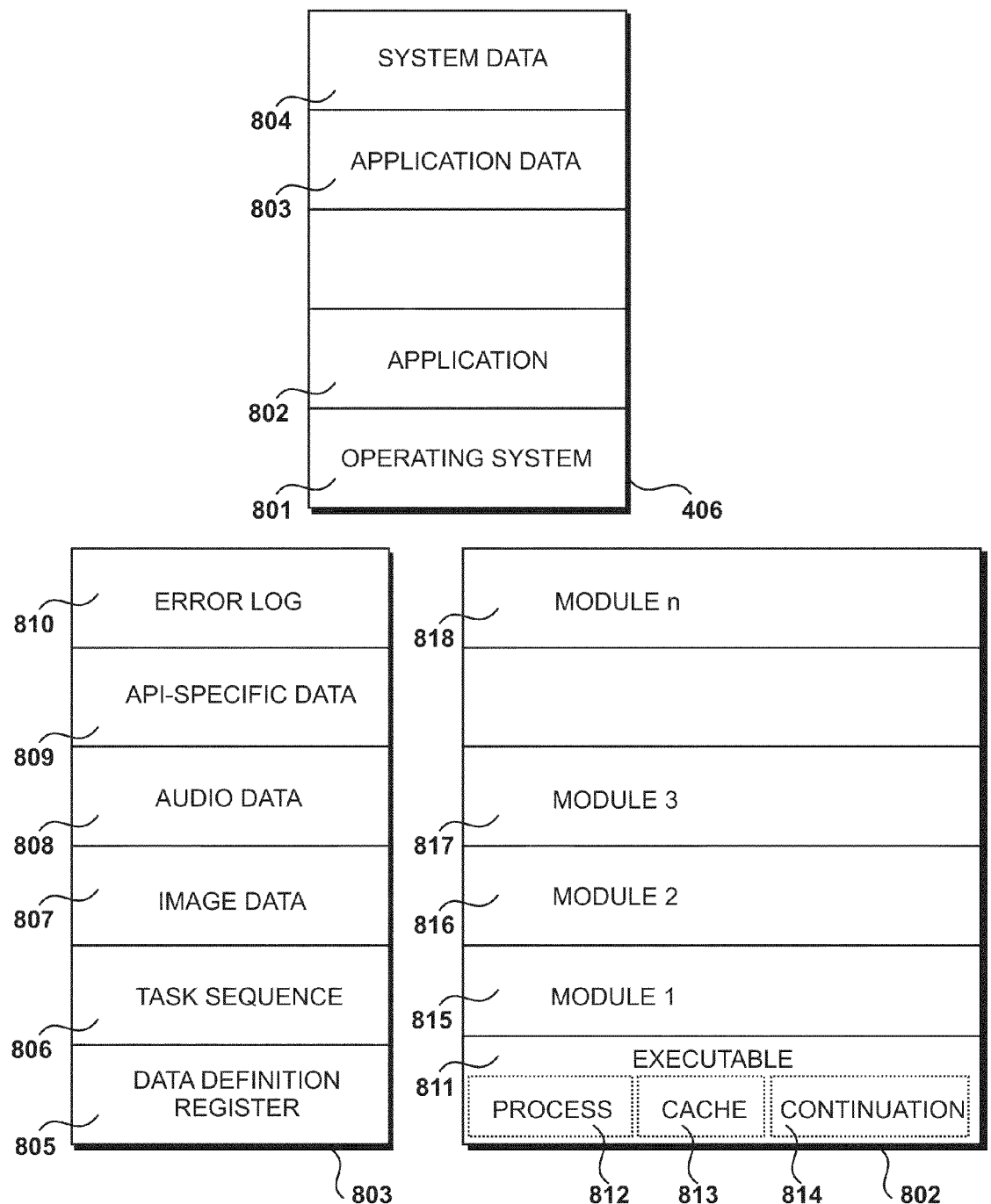
FIG. 8 shows the contents of the main memory as shown in FIG. 4 subsequently to the processing steps detailed in FIG. 7.

As a result of the processing performed by the steps in FIG. 7, the contents of main memory 406 are as shown in FIG. 8. The operating system that performs the loading resides in main memory as indicated at 801. The application is also resident in main memory as indicated at 802. System data 803 includes data used by the operating system 801. In the example, the operating system is Irix™, available from Silicon Graphics Inc., but the functionality of the present invention is equally extensible to alternative operating systems, such as Windows 2000™ or Windows NT™, available from the Microsoft Corporation of Redmond, or Linux™, freely available under the terms of the GNU General Public License or, alternatively, from a variety of commercial distributors.

Application data 804 includes data loaded by default at step 303 for the application, including a data definition register 805, a task processing sequence 806 and possibly image data 807, audio data 808, API specific data 809 and eventually an error log 810.

The application 802 comprises a plurality of application modules, wherein said plurality of application modules is dynamic. That is, the application 802 comprises a finite number application modules upon completing the processing performed by the steps in FIG. 7, but additional application modules, also known to those skilled in the art as plug-ins, may be dynamically loaded subsequently to the modules already loaded at the start of the application as the user interacts with the application 802 according to step 304.

The application 802 includes an executable module 811 which itself includes a process thread 812, a cache thread 813 and a continuation thread 814, respective details about which will be provided further in the present embodiment. In addition to the executable module 811, application 802 includes a plurality of application modules 815, 816, 817 and 818.

FIG. 9

Figure 9:
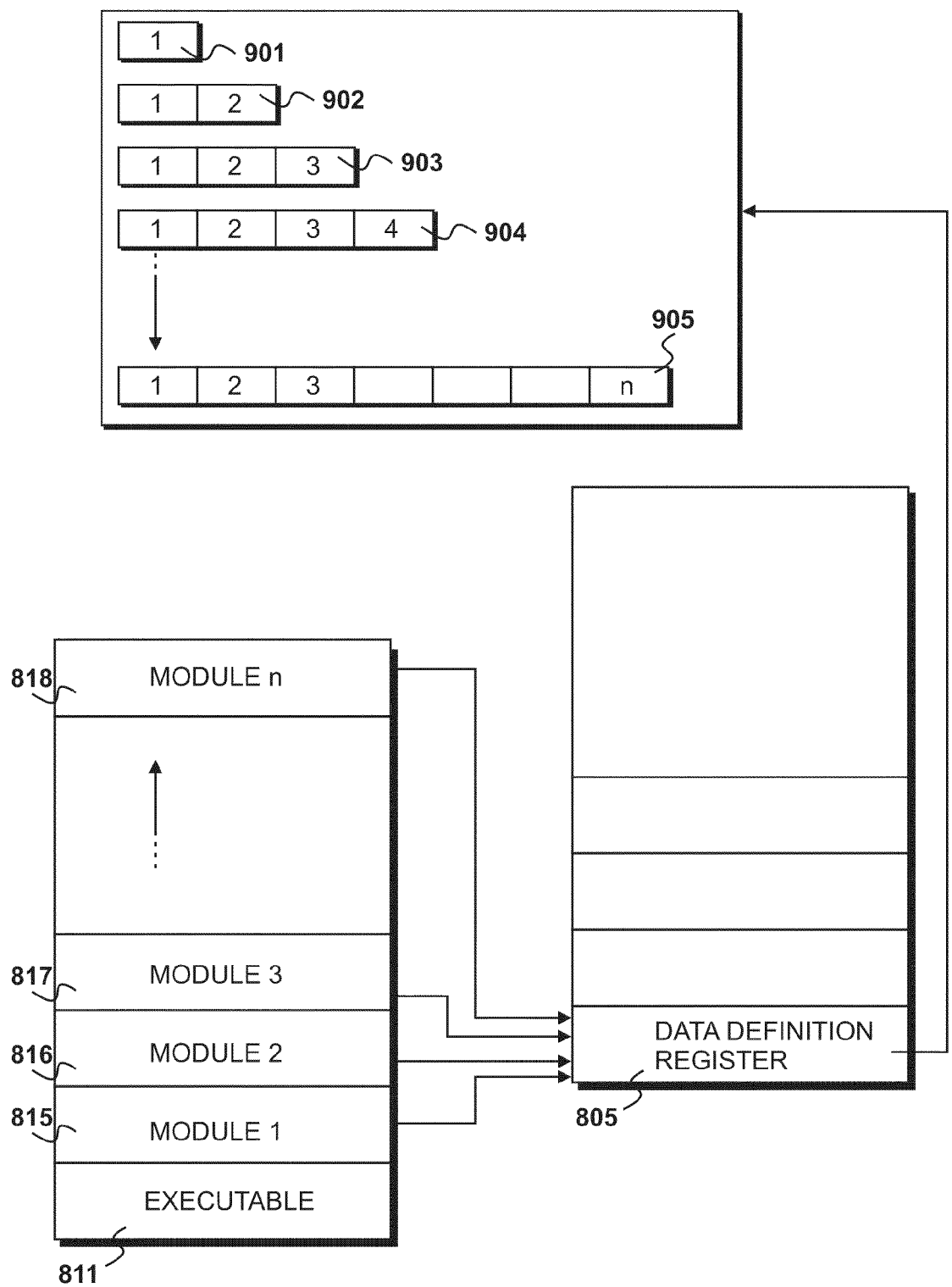
FIG. 9 graphically illustrates the instantiation of the data type register of the invention within the main memory as shown in FIG. 8.

According to the invention, although the data definition register 805 is instantiated as a static object within main memory 406, its structure is dynamic and graphically illustrated in FIG. 9. As was previously explained, the first application module to be initialised according to steps 702 through to 707 is the executable module 811. Accordingly, as the question 704 is answered negatively, the initialisation of the executable module 811 effectively instantiates the data definition register 805 itself as its first slot 901 is instantiated as a result of the processing step 705.

Thereafter, the next application module is selected at step 702 which, in the example, is module 815. As module 815 provides a first specific functionality for input data, the structure of which defers substantially from the input data to be processed by the executable module 811, the initialisation process of module 815 detects that the corresponding data definition does not exist within data definition register 805 at step 704 and thus increments the data definition register slots by one unit 902, within which the specific data definition 606 and default values 607 thereof are subsequently declared at step 706. Further data definition register slots 903, 904 and eventually 905 are respectively instantiated by the intialisationed processing steps 702 to 707 applied to modules 816, 817 and eventually module 818.

FIG. 10

Figure 10:
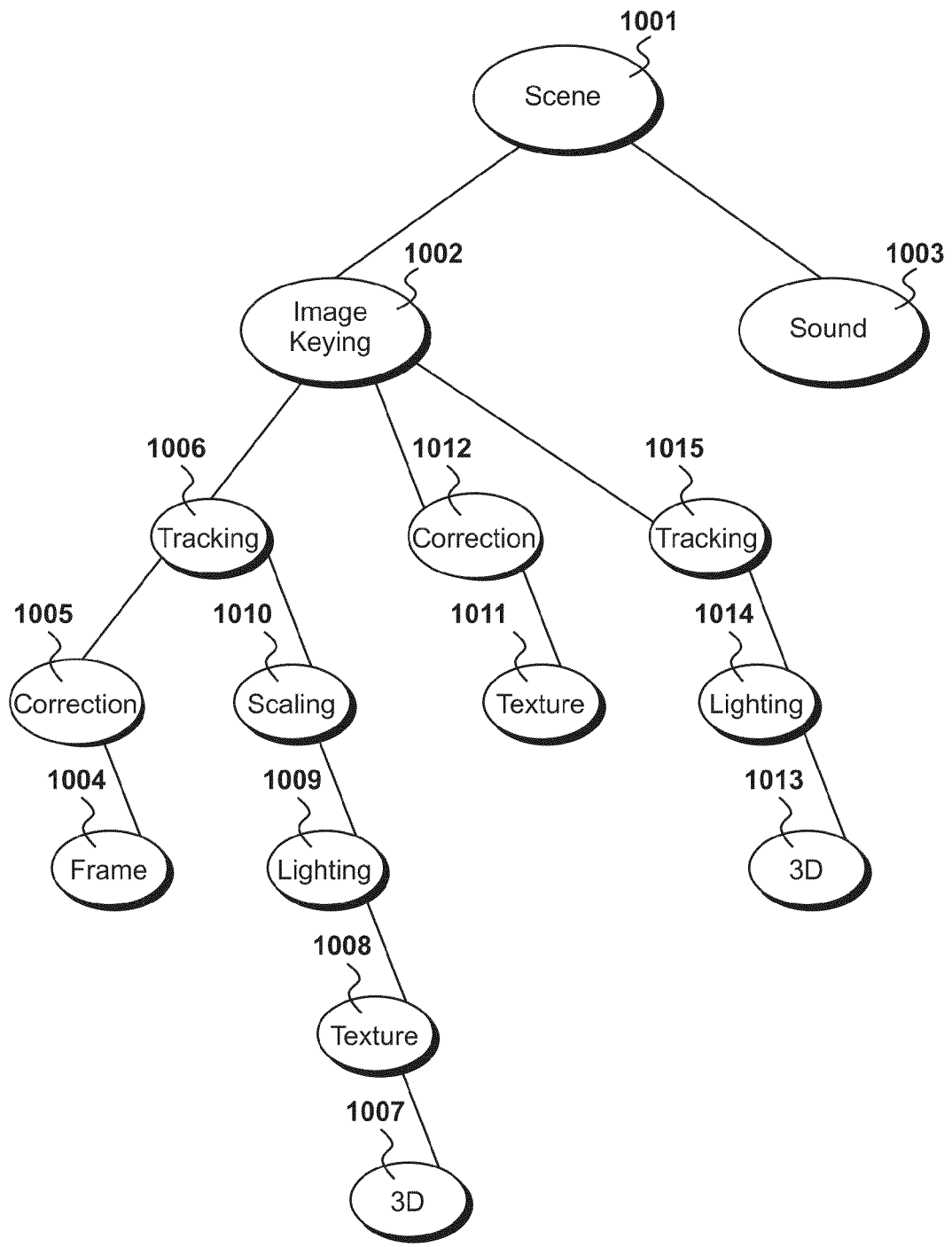
FIG. 10 shows a process tree as an example of the task processing sequence shown in FIG. 8.

A simplified example of an edit decision list, or process tree, is shown in FIG. 10 as the task processing sequence 806 loaded into memory 406 at step 708.

Process trees generally consist of sequentially-linked processing nodes, each of which specifies a particular processing task required in order to eventually achieve an output 1001, under the form of a composited frame or a video sequence. Traditionally, an output sequence 1001 will comprise both image data and audio data. Accordingly, the composited scene will thus require the output from an image-keying node 1002 and the output of a sound mixing node 1003. The image-keying node 1002 calls on a plurality of further processing nodes to obtain all of the input data it requires to generate the desired image data, or sequence of composited frames. In the example, the desired output image data includes a plurality of frames within which a three-dimensional computer generated object is composited, as well as a background also consisting of a plurality of three-dimensional objects superimposed over a background texture.

The image-keying node 1002 thus initially requires a sequence of frames 1004, each frame of which is subsequently processed by a colour-correction processing node 1005 and a motion tracking processing node 1006 such that the composited three-dimensional object generated by three-dimensional modelling node 1007, to which is applied a texture by the texturing node 1008 and appropriate lighting by artificial light processing node 1009 and finally appropriate scaling by scaling node 1010, is seamlessly composited within the colour corrected sequence of frames 1004.

In so far as the background is concerned, the image keying processing node 1002 also requires a uniform texture from a texturing node 1011, the functionality of which is similar to the texturing node 1008, to which is applied the colour-correction functionality of a colour-correction processing node 1012, the functionality of which is similar to the colour-correction processing node 1005. The image-keying processing node 1002 finally requires to overlay the plurality of simple three-dimensional objects generated from the three-dimensional modelling node 1013, which are appropriately lighted by the artificial light processing node 1014 and motion-tracked by means of the motion-tracking processing node 1015 over the colour corrected-texture 1011 before overlaying the composited frame sequence of node 1004 on top of the composited background.

FIG. 11

Upon completing the loading of the process tree shown in FIG. 10 at step 708, the application processing starts at step 709 and the process thread 812 executes the first process tree traversal. The traversal of a process tree designates a processing cycle which takes place approximately every one thirtieth of a second and is shown in further detail in FIG. 11.

Figure 11:
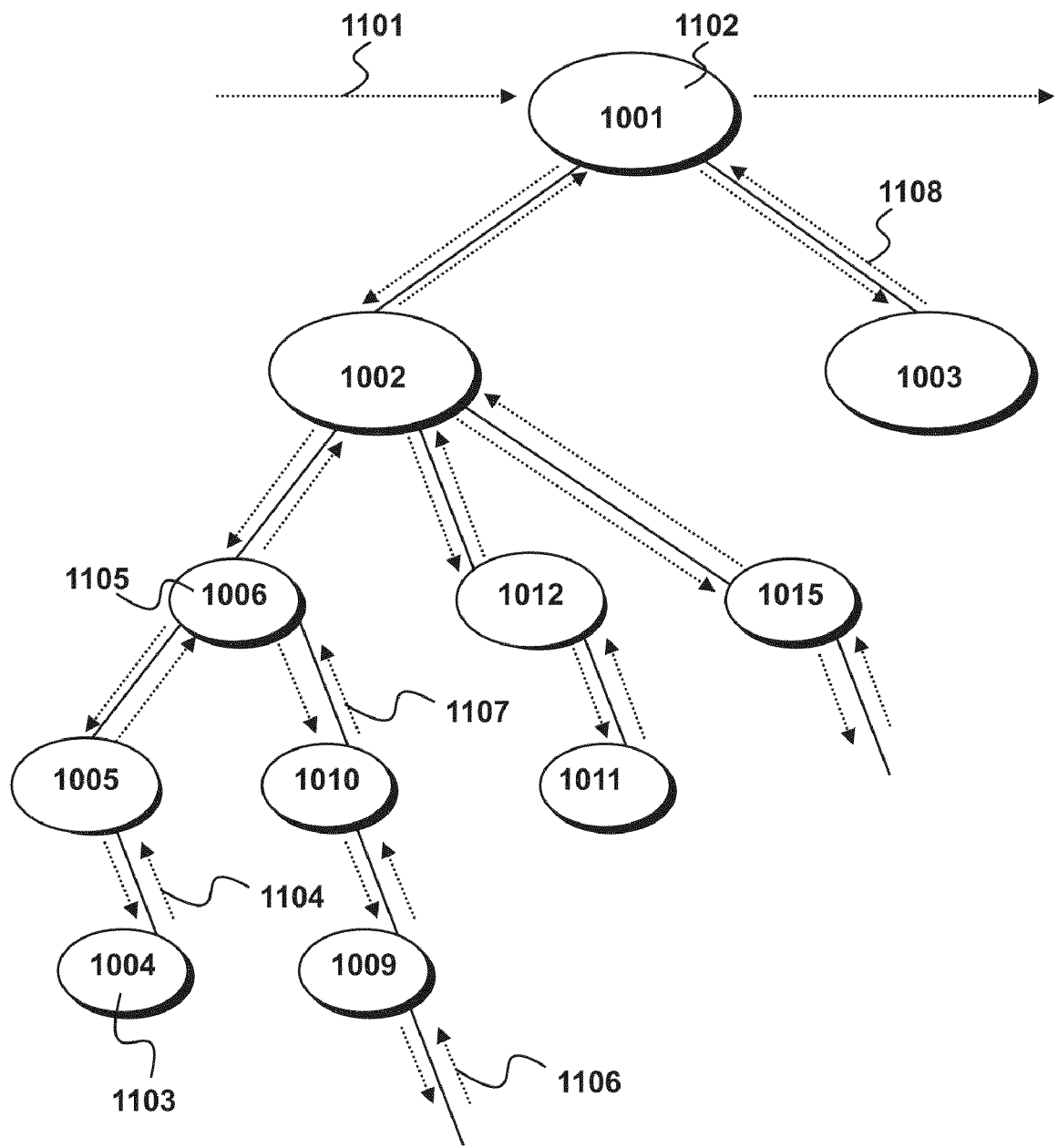
FIG. 11 graphically illustrates the processing flow, known as traversal, of the various processing modules invoked by the process tree of FIG. 10 according to the known art.

As was previously explained, a process tree is a task processing sequence, wherein input data is pulled by a parent node from its children nodes, i.e. processing nodes from which a processing node depends. In FIG. 11, the direction of processing is represented by a dotted line 1101, which shows that sequential node processing traditionally starts from the leftmost branch of a process tree to its rightmost branch. For any given branch comprising processing nodes, the traversal moves from the topmost parent processing node 1102 to the last child processing node 1103 of a branch. The traversal then reverses direction and moves back (1104) to the last parent node 1105 of the branch, at which point the input data processed by the traversed children nodes is pulled by said parent node 1105.

The traversal then considers whether there exists another branch 1106 from said parent node 1105, at which point the traversal again moves down the branch 1106 until such time as it reaches the last child processing node and moves back (1107) to parent node 1105. The above processing method is applicable to every combination of parent and children nodes within a process tree and thus a processing cycle only finishes when the traversal eventually returns (1108) to the topmost parent node 1102, which is traditionally the output node of the process tree, at which point a second traversal begins and so on and so forth.

FIG. 12

Figure 12:
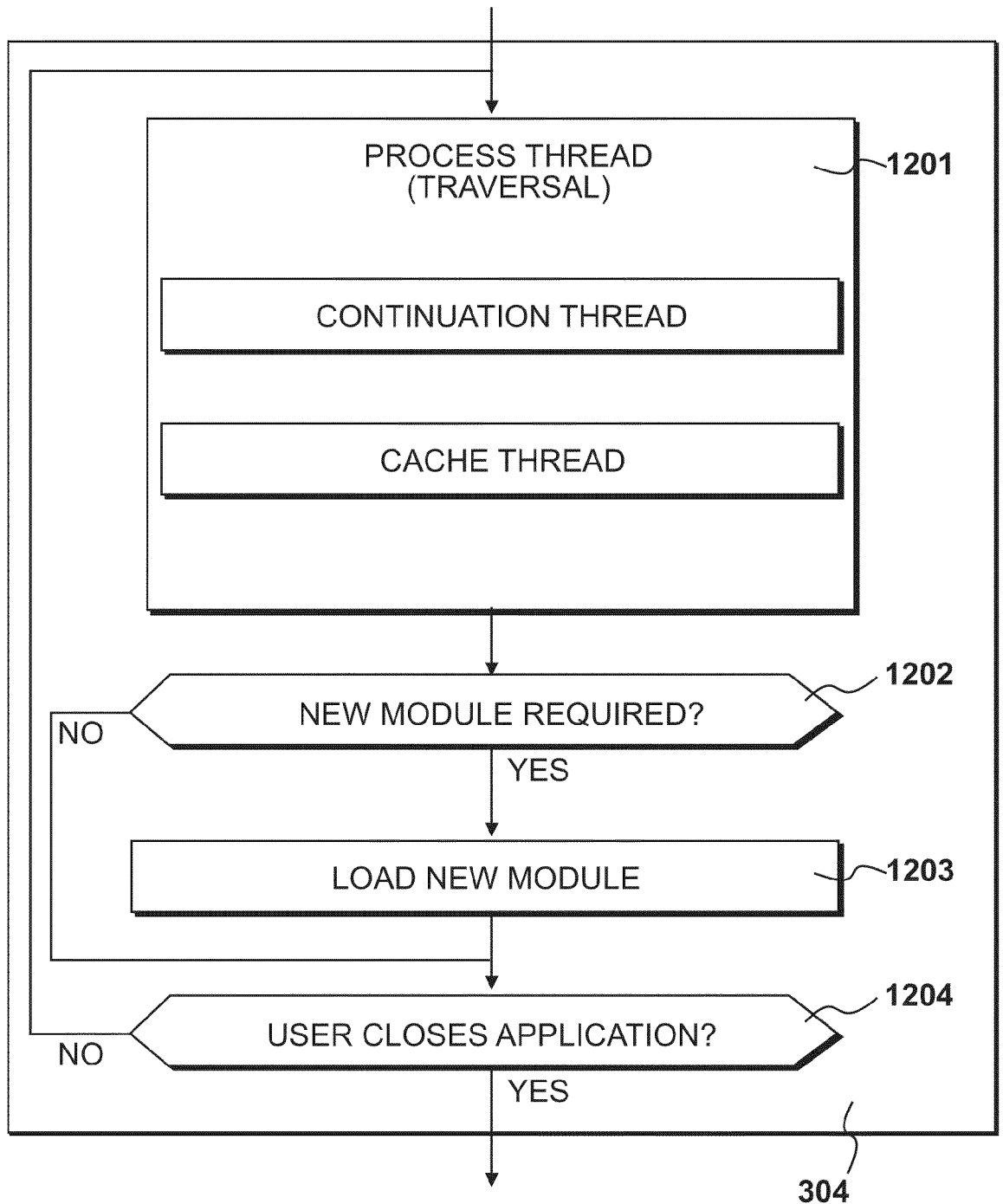
FIG. 12 details the processing steps of the main application shown in FIG. 8 once the initialisation process is completed.

The traversal is an integral part of the application 802 at runtime in so far that it takes place from the moment the application processing is started at step 709 until such time as the application is closed at step 305, whether the user of system 201 actively interacts with the application by means of specifying new processing tasks or modifying existing processing tasks by means of keyboard 204 or touch tablet 205, or whether the user of system 201 does not provide any input for an unspecified duration. The various steps performed by application 802 at runtime are further detailed in FIG. 12.

It was previously explained that, upon starting the application processing of step 709 the process thread 812 of the executable module 811 executes the first traversal of the process tree 806. Consequently, at step 1201, the process thread, or traversal, is shown as running and is also shown as including both the continuation thread 813 and the cache thread 813, which are concurrent sub-processes of said process thread.

At step 1202, a question is asked as to whether the user interacting with application 802 requires a new application module 818. If the question 1202 is answered positively, then the new module 818 is loaded at step 1203, the processing details thereof will be further detailed in the present embodiment. Control is subsequently directed to step 1204. Alternatively, if the question asked a step 1202 is answered negatively, control is also directed to step 1204, wherein another question is asked as to whether the user has interacted in such a way as to signify his intent to close the application 802. If the question asked at step 1204 is answered positively, then control is directed to step 305, wherein the application is closed and system 201 is eventually switched off at step 306. Alternatively, if the question asked at step 1204 is answered negatively, control is subsequently returned to the concurrently running process thread 812, continuation thread 814 and cache thread 813 of step 1201.

FIG. 13

Figure 13:
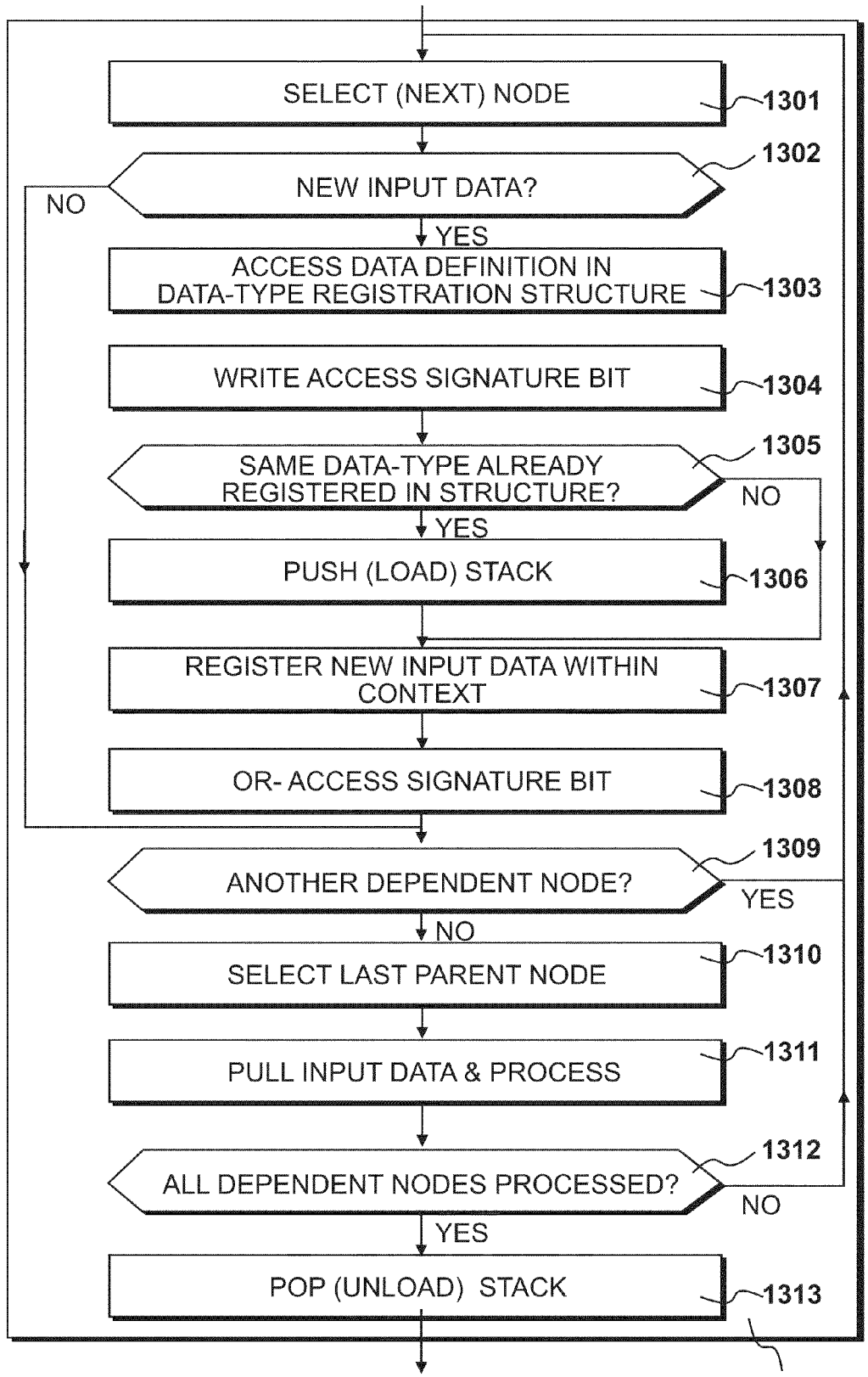
FIG. 13 details the processing steps of the process thread shown in FIG. 12 according to the invention.

The processing steps according to which the process thread 812 at step 1201 traverses the task-processing sequence 806 illustrated in FIG. 11, are further detailed in FIG. 13.

At step 1301, the process thread, or traversal, selects the next processing node within the process tree according to the processing direction 1101. At step 1302, a question is asked as to whether the selected node has new input data; if the question is answered negatively, then control is directed to step 1309, which will be detailed further below in the present embodiment. Alternatively, the question asked at step 1302 is answered positively and the context object 609 of the selected node accesses the data definition slot 606, 901 in the data definition register 605, 805 at step 1303.

At step 1304, the process thread writes a data definition access signature bit in the data definition register in order to temporarily record which specific slot is accessed by the processing node within the data definition register at step 1303. At step 1305, a question is asked as to whether there already exists input data registered to the slot accessed in the data definition register which is different from the default slot data. If the question asked at step 1305 is answered negatively, control is directed to step 1307. Alternatively, if the question asked at step 1305 is answered positively, the process thread pushes the portion of main memory 406 specifically affected to the slot accessed at step 1303 and known to those skilled in the art as the memory stack at step 1306, such that the new input data identified at step 1102 can be registered within the data definition register as specific values to replace the last or current default values 607 at step 1307.

At step 1308, the slot access signature bit which was written at step 1304 is OR-ed such that the next slot access within the cycle can be accurately identified with the least possible resource usage.

Accordingly, at step 1309 a question is asked as to whether there exists another processing node dependent upon the last node selected at step 1301. If the question of step 1309 is answered positively, then control is directed back to said step 1301. Alternatively, the process thread 812 selects the last parent node accessed at step 1310, thus representing the traversals change of direction 1104. In accordance with the traversal description of FIG. 11, input data is pulled and processed at step 1311, whereafter a question is asked at step 1312 in order to determine if all the dependent nodes from the parent node selected at step 1310 are processed. If the question asked at step 1312 is answered negatively, i.e. if another branch 1106 is identified, then control is directed back to step 1301, wherein the next dependent node is selected. Alternatively, the memory stack which was pushed at step 1306 is eventually popped, or unloaded, at step 1313 and control is subsequently directed to step 1204 and so on.

FIG. 14

Figure 14:
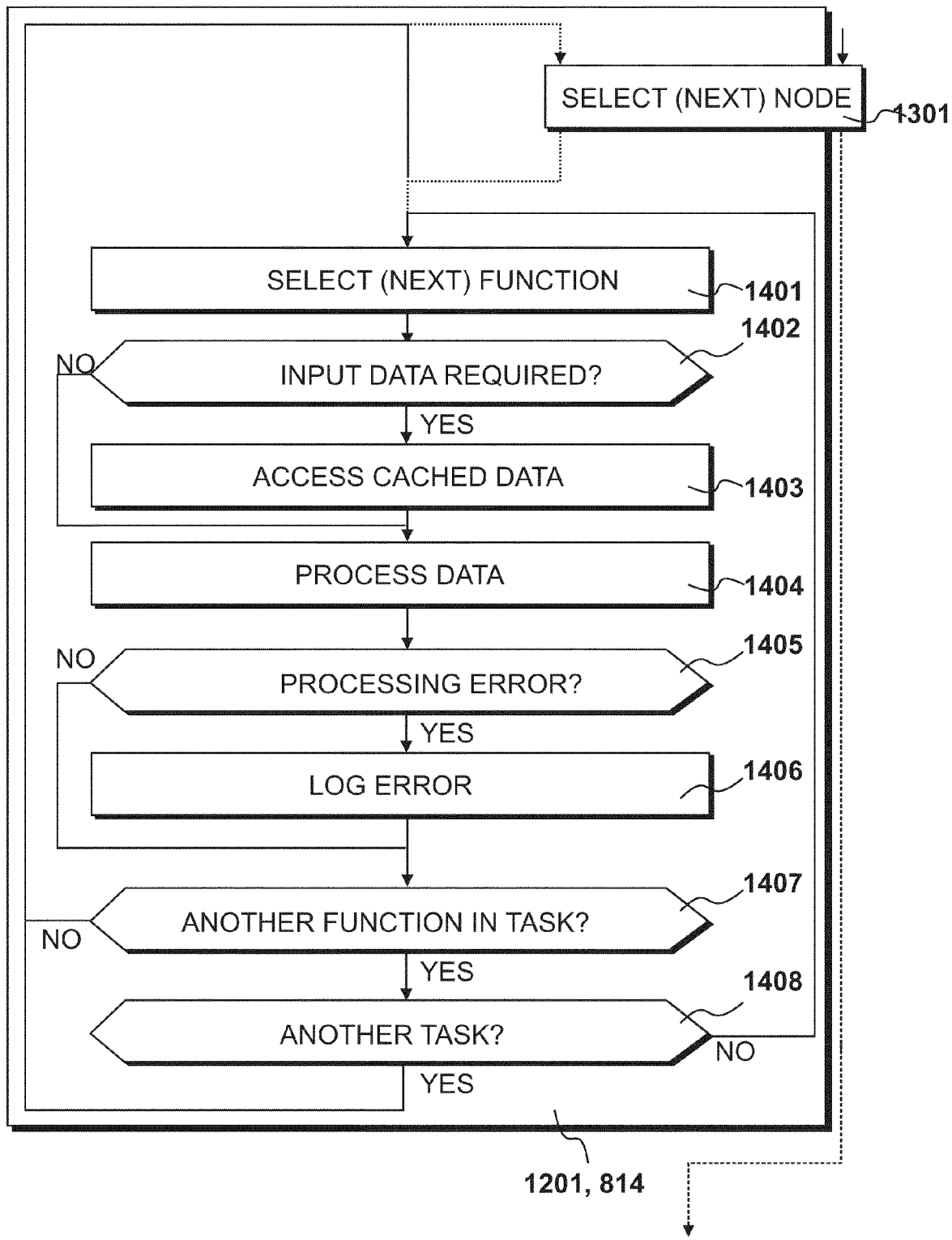
FIG. 14 details the processing steps of the continuation thread also shown in FIG. 12 according to the invention.

The continuation thread 814 operating at concurrently with the process thread 812 is further detailed in FIG. 14. The continuation thread is in effect a sub-process of the process thread 812, and its function is to ensure that for each processing node selected by the process thread, the operational functions within said processing node are processed in an accurately sequential order as specified by the module's main function 608.

As a traversal is generally accomplished within a thirtieth of a second, but the various processing nodes composing a process tree may require varying lengths of time in order to generate the output required by their parent node, often as not exceeding one thirtieth of a second, there exists a need to process every operational function of each processing node one at a time, i.e. process a fraction of the workload of each processing node at every traversal, instead of processing the totality of the main function 608 called by every processing node in turn.

Accordingly, as the process thread selects the next node in the traversal at step 1301, the continuation thread 814 selects the next operational function within the application module represented by said selected node at step 1401. At step 1402, a question is asked as to whether the next selected function requires input data. If the question at step 1402 is answered negatively, control is forwarded directly to step 1404. Alternatively, the question at 1402 is answered positively and the selected operational function accesses the cached data at step 1403, whereafter the operational function of the selected node processes the data at step 1404.

At step 1405, the question is asked as to whether a processing error has occurred, i.e. the function selected at step 1401 is unable to process the data registered within the data definition register at step 1307 and instead processes the default input data values 607. If the question asked at step 1405 is answered negatively, control is subsequently forwarded directly to step 1407. If the question asked at step 1405 is answered positively, however, the continuation manager logs the error detected at step 1405 at step 1406 within the error log 810. According to a preferred embodiment of the present invention, the continuation thread is configured to log which operational function of which module has experienced a control error, as well as the data definition register slot 606, input data registered at step 1307 and default data 607.

Upon completing the error logging process of step 1406, a question is asked at step 1407 which considers whether there exists another operational function in the selected node left to be processed. If the question at step 1407 is answered negatively, control is then returned to step 1301 of the process thread, whereby the next node is selected, which enables the continuation manager to select the next function to be processed in said subsequently selected node. Alternatively, the question of step 1407 is answered positively, whereby another question is asked as to whether there exists another dependent node for the process thread to select. If the question of step 1408 is answered positively, control is subsequently returned to step 1301 of the process thread. Alternatively, the continuation manager selects the next available function in the current node at step 1401 in order to prune the remaining workload within the current traversal.

FIG. 15

The cache thread 813 operating concurrently with the process thread and the continuation thread at step 1201 is also a sub-process of the process thread 812. The function of the cache thread 813 is essentially to maximise the efficiency of the caching of input data required for the data processing a parent node. In order to achieve this functionality, the cache thread precisely determines which input data needs to be cached by a parent node from its children, utilising the least possible processing resources, to the exclusion of any other data which does not require caching.

As the process thread 812 OR-s the access signature bit for the currently selected node at step 1308, the cache thread restores said OR-ed access signature bit at step 1501 in order to accurately identify which data definition register slot 606, 901 was accessed by the currently selected node and thus at step 1502 match the data definition contained therein with the corresponding input data identified at step 1302. Upon successfully carrying out said matching operation at step 1502, the new input data is returned from the cache at step 1503.

At step 1504 a question is asked as to whether the process thread has assessed that all dependent nodes have been processed at question 1312. If the question at step 1504 is answered negatively, the cache thread restores the next access signature bit OR-ed by the process thread at step 1308 at step 1501. Alternatively, the question of step 1504 is answered positively, meaning that all the dependent nodes of the last parent node selected have been processed and the cache thread subsequently OR-s the input data currently held in the cache at step 1505. The cache thread then again restores the next access signature bit OR-ed by the process thread at step 1308 at step 1501, and so on and so forth.

FIG. 16

Figure 15:
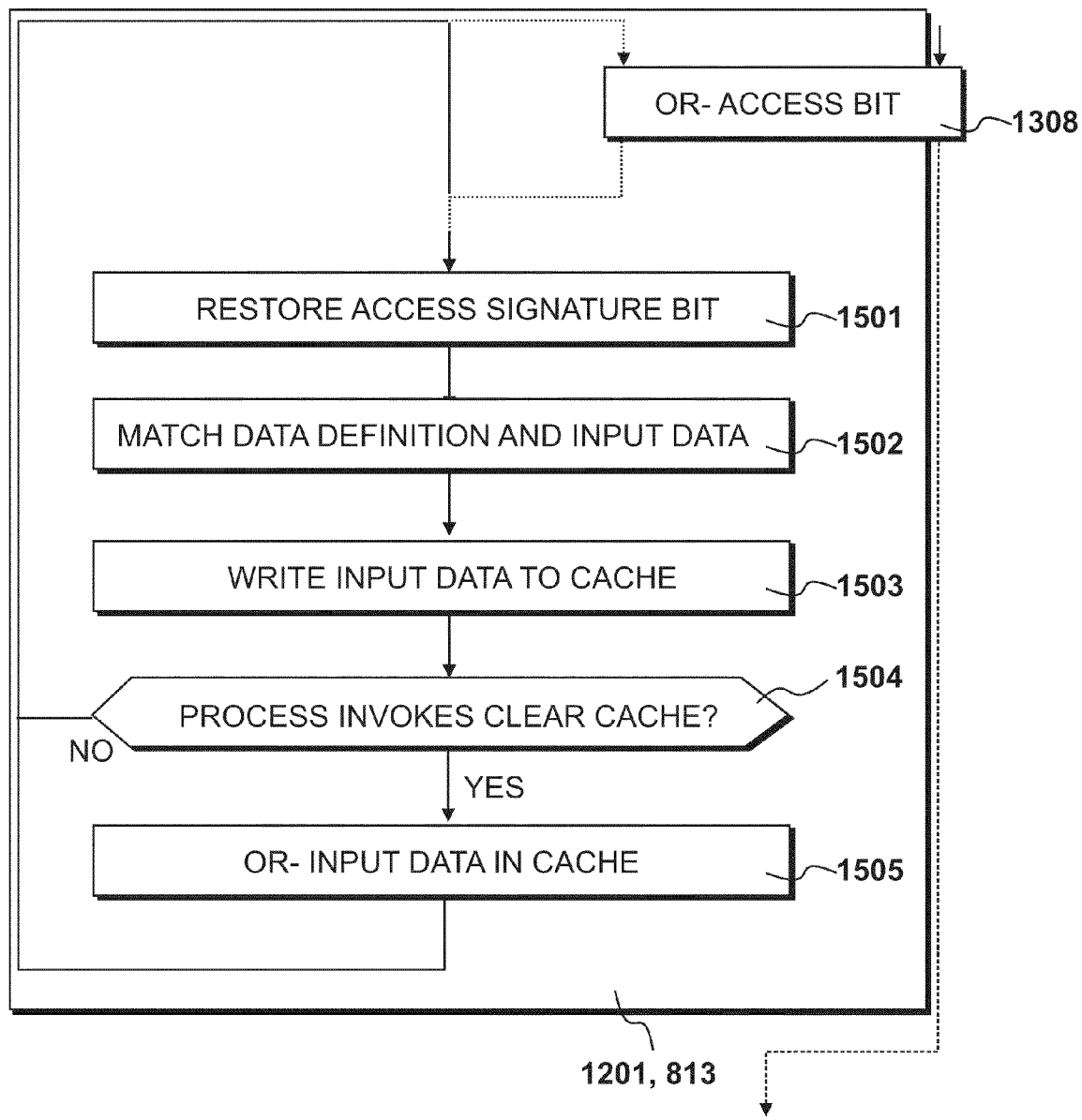
FIG. 15 details the processing step of the cache thread also shown in FIG. 12 according to the invention.

The process thread detailed in FIG. 13, continuation thread detailed in FIG. 14 and cache thread detailed in FIG. 15 of the present invention are concurrent processes which, when processed by processors 401 and 402 at runtime, instantiate a single processing pipeline, the benefit of which will be better appreciated by reference to a processing cycle according to the prior art shown in FIG. 16.

For the purpose of clarity, a simplified processing cycle 1601 is shown, which includes a parent node 1602 and three children nodes 1603, 1604 and 1605. It will be understood and apparent to those skilled in the art that the following detailed description of processing cycle 1601 could equally apply to much more extended processing cycles, such as the traversal 1101 shown at FIG. 11, which potentially includes hundreds of even thousands of combinations of parent and children nodes.

According to the prior art, in order to generate the output data 1606 of the parent processing node 1602, two operational functions 1607 and 1608 are sequentially called. The first function 1607 called requires the output data 1609 of a first child processing node 1603 and the output data 1610 of a second child processing node 1604 as its input data. The second function 1608 called requires the output data 1611 of the third child processing node 1605 as its input.

As the output data 1609 and 1610 are sequentially pulled by the function 1607, after which the second function 1608 pulls the output data 1611, it can be appreciated that the parent node 1602 has no knowledge of the data definition or, in essence, structure of the output data 1609 prior to function 1607 first attempting to process said output data 1609 when pulled. Similarly, the parent node 1602 has no knowledge of the data definition of output data 1610 and the data definition of output data 1611.

With reference to the sequential manner in which functions 1607 and 1608 pull data from the children nodes 1603, 1604 and 1605, there exists the potential for the output data 1606 of the parent node 1602 to be corrupted or even for either of function 1607 or 1608 to cease processing input data and thus potentially crash the application if any of the pulled data 1609, 1610 and 1611 does not conform to the data structure, or definition, required by said functions 1607, 1608. Said lack of conformity may arise from an engineers' mistake when implementing functionality to the application modules 1603, 1604 or 1605 or, alternatively, because an engineer has implemented said functionality and thus its output data outside the applications' standard API rules.

FIG. 17

According to the present invention, however, a data definition 606 and data default values 607 are declared within a data definition register 605 by every single application module 811 to 818 of application 802 initialised according to the invention at step 303. Upon starting the application processing at step 709, the process thread 812 of the present invention enables parent and child processing modules to register (the input data 1609, 1610 and 1611 actual values of) within the data definition register 805, i.e. the scope of a parent node functionality, e.g. the processing cycle 1601 of parent node 1602.

The present invention maintains the scope of the parent's node functionality by means of the context object 609, which will be better understood by those skilled in the art with reference to a context function implemented according to the prior art. An edited example of the source code for a context function according to the prior art is shown in FIG. 17. The source code is written in C++ and is heavily edited to convey the essence of its functionality, as will be appreciated by those skilled in the art.

In the source code listing, a function is declared, such as for instance function 1607. At 1701, the line of code which will be compiled into machine-readable instructions that can be processed by processors 401, 402 pushes the data definition register slot 606 according to step 1306, thereby defining the duration of the scope 1702 of function 1701. Operational sub-functions 1703 and 1704 are subsequently called and processed within scope 1702 until such time as the processing is completed at 1705 and the memory stack is unloaded at 1706 according to step 1313, thereby terminating the scope 1702.

As said memory stack is unloaded by the line of code 1706, the data definition and actual values are unloaded within the data definition register such that the next function 1608 cannot benefit from the data definition and values registered within scope 1702.

FIG. 18

The above limitation is overcome by the present invention with the implementation of the context object 609, which is further detailed in FIG. 18. An edited example of the source code is shown as written in C++ and is heavily edited to convey the essence of the invention. Proper engineering practice known to those skilled in the art will result in these features being placed in several files, including header files, as will be appreciated by those skilled in the art.

In the source code listing, a context object 609 is initially declared, within which a scope function 1801 is first declared in order to define the duration of the scope 1802 according to the invention. Conditional parameters 1803 are subsequently implemented, which define instances according to which the data definition 606 and values 607 should be pushed within the data definition register 605, 805 according to step 1306 by means of instructions 1804.

As the duration of the scope 1802 is initiated before any operational functions are called, such as functions 1607, 1608, the scope 1802 remains active and maintains all of the changes of the data definition register 605, 805 accessible to said subsequently called operational functions 1607, 1608. As the context object 609 is invoked at every parent processing module within a task processing sequence 806, each of said parent processing module eventually generates output data, at which point its operational functions 1607, 1608 cease being invoked and the context object 609 terminates at 1805, thereby unloading the memory stack according to step 1313.

FIG. 19

Figure 19:
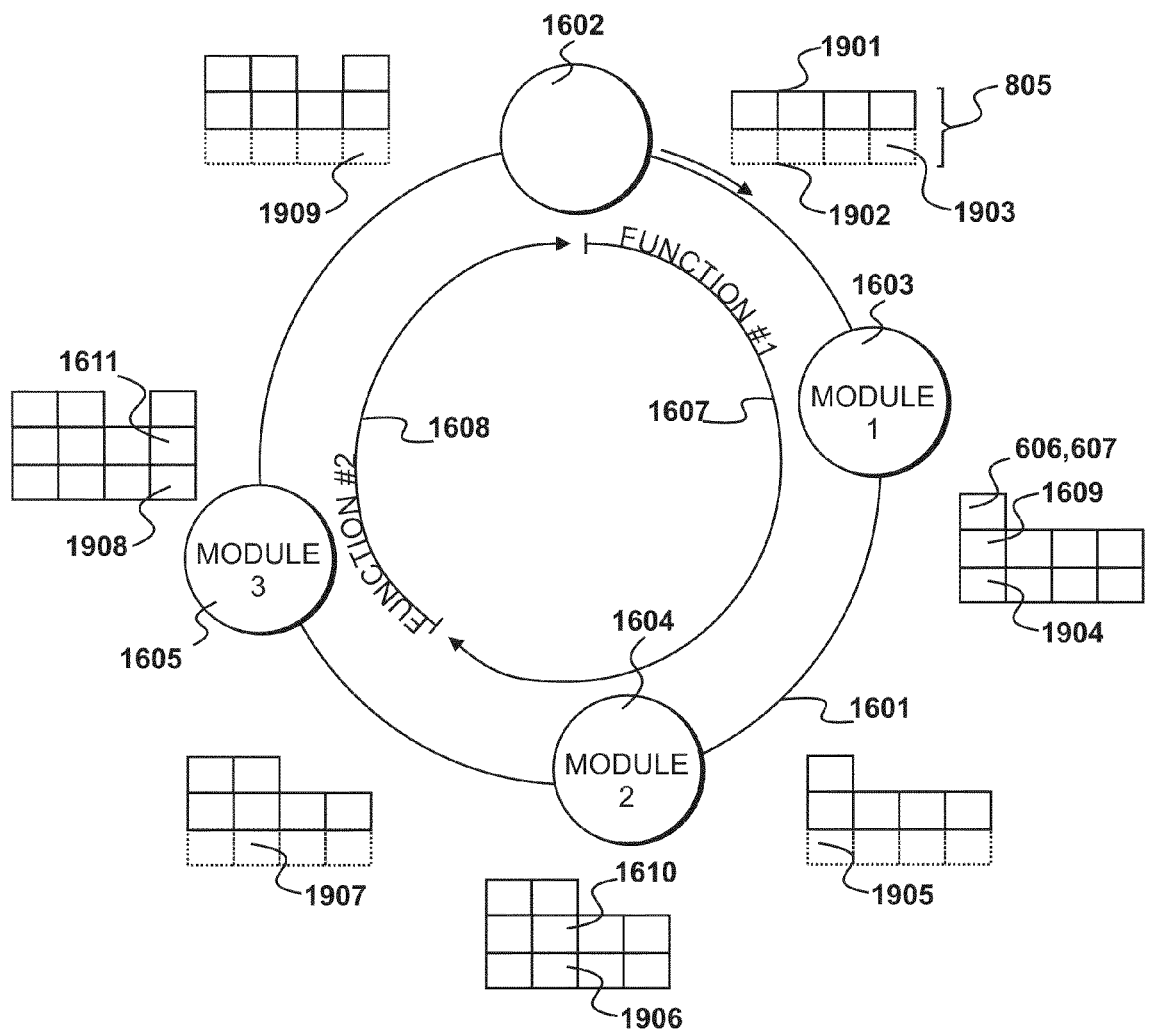
FIG. 19 shows the processing cycle of FIG. 16 generating a multiple processing pipeline according to the invention, based upon the concurrent processing of the process thread of FIG. 13, continuation thread of FIG. 14 and cache thread of FIG. 15.

Changes within the data definition register 605, 805 during a processing cycle such as processing cycle 1601 are shown according to the invention in FIG. 19. The data definition register 805 is shown equipped with data definition register slots 1901, each of which represents the data definition 606 and default values 607 thereof for every processing module 1602 to 1605 initialised for an application. Data definition register 805 also includes an access signature bit slice 1902, wherein each data definition slot 1901 within the data definition register is assigned an OR-ed signature bit 1903.

As the processing cycle 1601 is initiated, the next node 1603 is selected according to step 1301, the process thread determines that there exists new input data 1609, the corresponding data definition 606 is accessed in the data definition register 805 and the corresponding access signature bit 1904 is written according to step 1304. There already exists a default values 607 registered within register 805 so the stack is shown as pushed according to step 1306 and input data 1609 is shown as registered within the register 805.

The next operational function of child node 1603 is selected by the continuation manager according to step 1401 and, as no input data is required, said first operational function processes its data at step 1404. In the example, no processing error occurs and there exists no other function to be carried out by child node 1603, thus the continuation thread will select the next node selected by the process thread at step 1301, i.e. child module 1604.

The access signature bit 1904 is subsequently OR-ed according to step 1308 at 1905, whereby it is restored by the cache manager according to step 1501, which matches the access signature bit 1904 to the data definition 606 and input data 1609, and thus writes said data 1609 to the cache (not shown) of the parent node 1602. At step 1309, there exists another dependent node 1604 and the process thread subsequently selects the next child module 1604, whereby the cache thread awaits the next signature bit OR-ing.

In accordance with the method described thereabove, the data 1610 of the child module 1604 is registered within the data definition register 805 after the corresponding access signature bit 1906 is written. Said access signature bit 1906 is subsequently OR-ed at 1907, whereby data 1610 is also cached within the cache of parent node 1602. Upon selecting the next child module 1605, the process thread writes the access signature bit 1908, data 1611 is registered within the data definition register 805 and cached within the parent node cache. Said access signature bit 1908 is eventually OR-ed at 1909. Throughout processing cycle 1601, the parent node 1602 has full knowledge of the data definitions 606, default values 607 thereof and actual values 1609 to 1611 such that, should the processing of said data 1609 to 1611 result in a processing error at step 1405 and subsequent error logging at step 1406, functions 1607 and 1608 process the default data values 607 rather than the actual data 1609 to 1611, thus nullifying any corruption of the output data 1606 of the parent node 1602, or even fatal processing error by functions 1607, 1608.

FIG. 20

Figure 20:
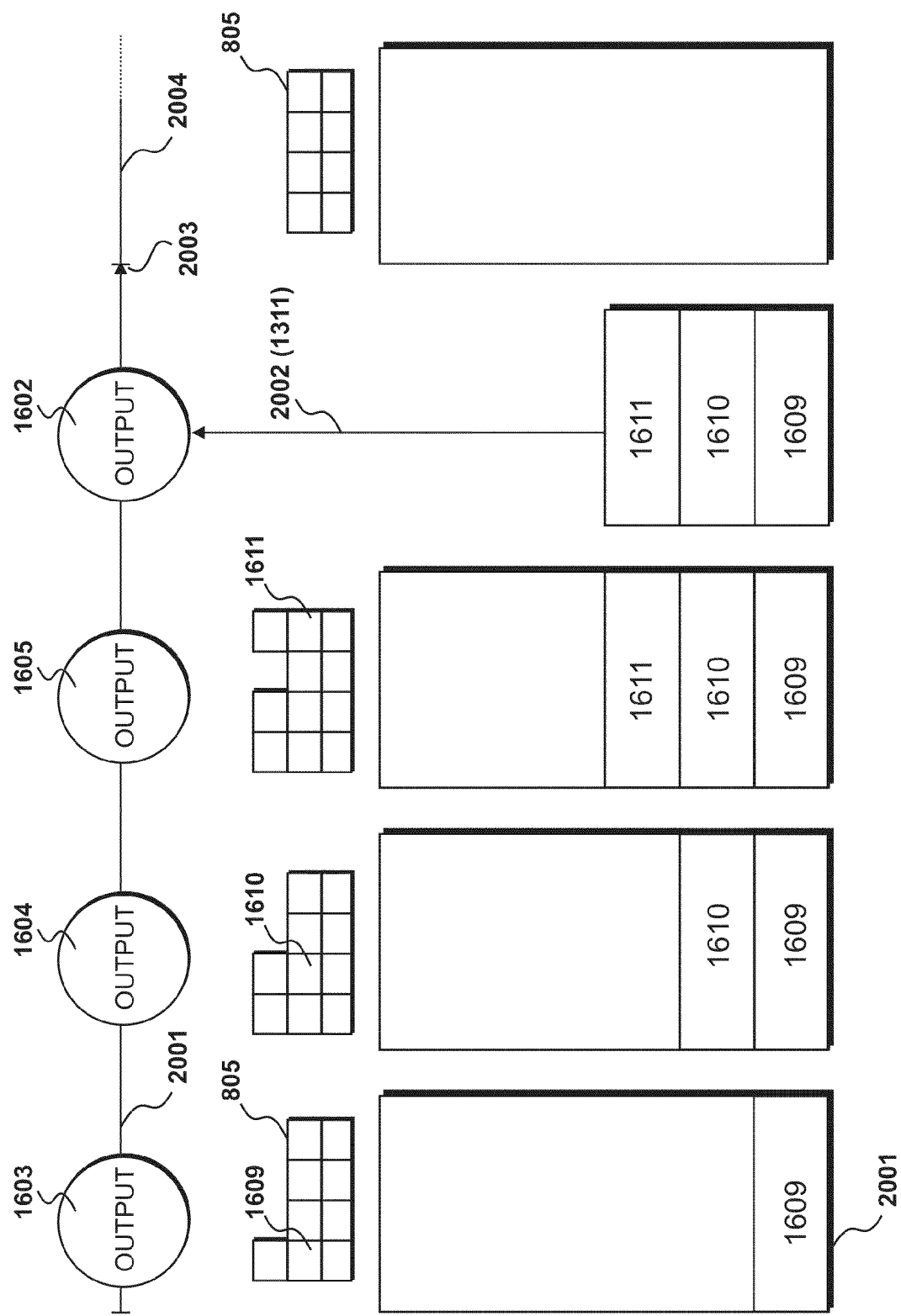
FIG. 20 shows the cache management effected by the cache thread of FIG. 15 within the processing cycle of FIG. 19.

The efficiency of the memory cache management implemented by the cache thread 813 of the present invention is further detailed in FIG. 20, whereby the contents of a memory cache 2001 implemented either in secondary cache 403, 404 or main memory 406 or a combination thereof are shown over a period of time equivalent to one processing cycle such as processing cycle 1601.

It was previously explained that as the first access signature bit 1904 is OR-ed at 1905, it is restored by the cache thread according to step 1501, whereby it enables the cache thread to match the corresponding data definition 606 with actual data, such as data 1609. Upon completing said matching operation, the cache thread is configured to write said input data 1609 within cache 2001 and, commensurate with the sequential method of module traversal by the process thread 812, the cache thread sequentially writes input data 1610 and 1611 within cache 2001 and it can be assessed that only the data required by the parent processing module 1602 is cached, to the exclusion of any other irrelevant data. This enables said parent module 1602 to accurately pull (2002) the input data 1609, 1610 and 1611 from the cache 2001 for processing, whereby the absence of irrelevant data improves processing time since the parent node 1602 does not need to sieve said extraneous, irrelevant data.

In the example, all dependent modules 1603, 1604 and 1605 have been processed by the process thread 812 at 2003 and said process thread unloads the memory stack at step 1313, thereby invoking the cache thread to clear the cache at step 1504, whereby the cache 2001 is OR-ed according to step 1505 for the next processing cycle 2004.

FIG. 21

In the example field of digital video compositing, wherein task processing sequence 806 mostly takes the form of the process tree detailed in FIG. 10, the processing cycle 1601 of which is detailed as traversal 1101 to 1108 in FIG. 11, the benefits of the present invention will be clearly appreciated by those skilled in the art. Indeed it is common for process trees to incorporate hundreds and potentially even thousands of logically-linked process nodes configured as parent processing nodes and children processing nodes, each of which symbolises the call on operational functions of application modules 811 to 818. In a preferred embodiment of the present invention, there results the ability for the user of a video editing terminal 201 to reliably obtain an output composited frame or sequence even if an operational function invoked malfunctions during a traversal. Moreover, there also results the ability for the user of the video editing terminal 201 to implement new tasks within the task processing sequence 806, thus potentially declaring new parent and children nodes, the operational functions of which need not be declared within the same API as the application 802 so long as each of said new modules initialises a data definition register slot 606 and default values 607 thereof within the data definition register 805.

Figure 21:
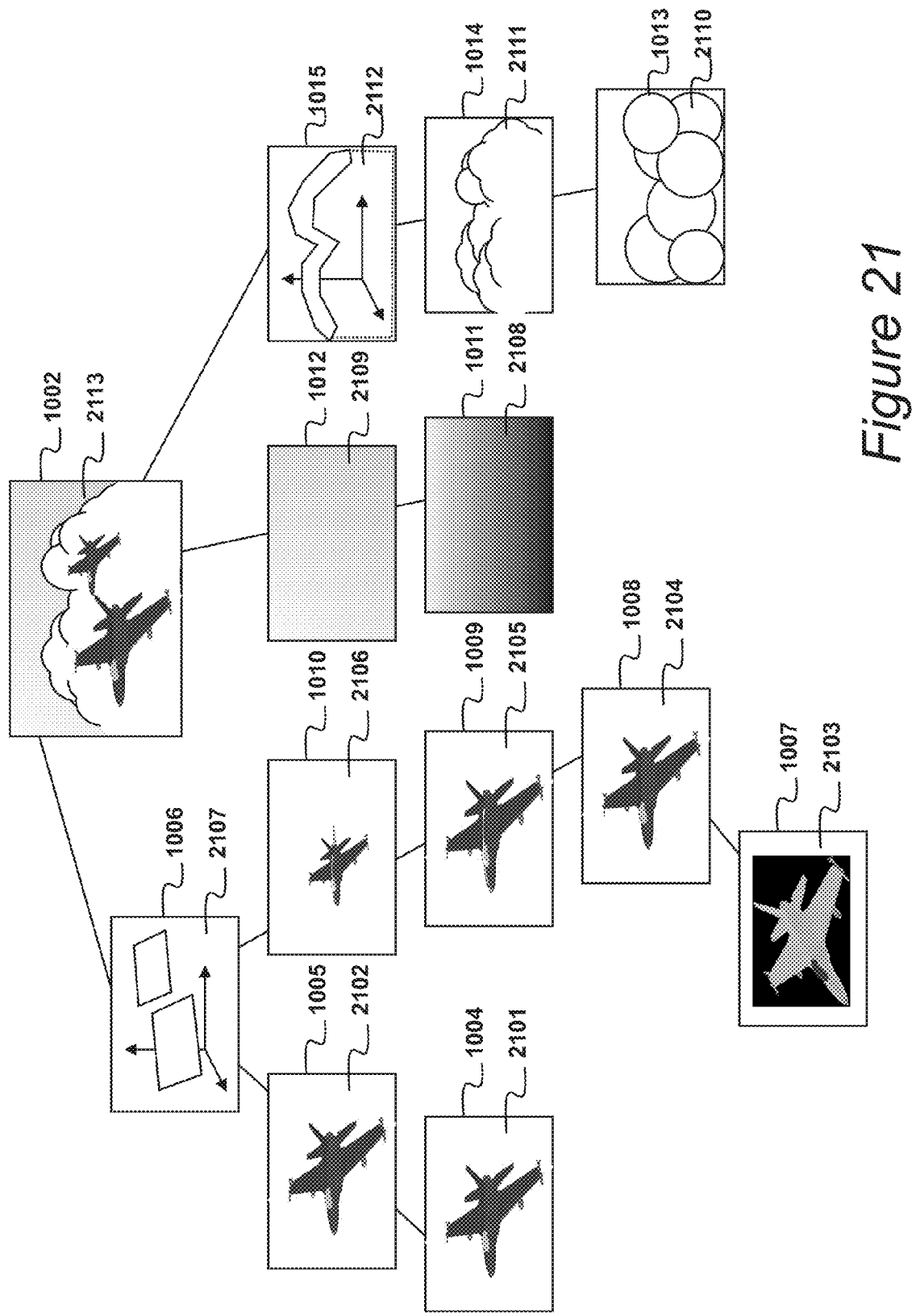
FIG. 21 provides a graphical representation of the data generated at each processing module of the process tree shown in FIG. 10 when said processing modules are traversed according to the invention.

The respective output data of each parent and children nodes 1001 to 1015 of the process tree detailed in FIG. 10 are graphically shown in FIG. 21 in order to illustrate the input data pulled and processed at step 1311 within the context of the process thread, continuation thread and cache thread according to the present invention.

The traversal 1101, i.e. process thread 812, initially traverses the process tree in accordance with the detailed explanation of FIG. 11, thus initially proceeds to the leftmost last child node 1004, whereby an operational function of the child node 1004 is invoked in order to fetch a frame 2101 which depicts a real plane photographed in front of a blue background in order to facilitate subsequent keying processes. Node 1005 is a parent node of node 1004 and thus subsequently able to pull the frame 2101 from the cache, and its colour correction operational function modifies the colour 2102 of said frame by applying a processing rule to every pixel of said frame. According to the invention, it is known to parent node 1005 that frame 2101 comprises a finite number of pixels corresponding to the resolution of frame 2101 as the definition 606 of the frame is an array of pixels and its default value 607 is for instance the default number of pixels in a NTSC frame.

The traversal 812, 1101 subsequently identifies the next branch depending from the parent node 1006 and thus proceeds to node 1007, whereby a three dimensional computer generated model 2103 of a plane is generated by operational functions of said node 1007. Its parent node 1008 is subsequently able to pull said three-dimensional computer-generated model in order to apply a "steel" bitmap texture to each polygon of said three-dimensional model, which is a plane. It is known to node 1008 that the three-dimensional model is composed of polygons defined by tessellating the smallest component of the model, which are vertices. The definition 606 of the three dimensional model is an array of polygons, and the default value is, say, a cube model. The actual value registered within the data definition register 805 by processing node 1007 includes all of the three dimensional co-ordinates of said vertices. Parent processing node 1008 is therefore able to correctly apply the "steel" bitmap texture to the array of polygons 2103 generated by node 1007. According to the invention, if an operational function of node 1007 was faulty and did not output an array of polygons defined in three-dimensional space which the operational function of node 1008 could thus process so as to equip the three dimensional model 2103 with a texture, then the parent node 1008 would equip a cube with said steel bitmap texture, since it is the default value.

Processing node 1009 subsequently applies an artificial lighting algorithm at 2105 to the textured three-dimensional model and processing node 1010 can subsequently scale the lighted (2105), textured (2104) three-dimensional model 2103 at 2106. The parent node 1006 of nodes 1005 and 1010 subsequently pulls the data of said nodes according to step 1311 and calls an operational function designed to animate the real plane in the frame 2101 and the composited plane 2106 in relation to one another within a same three dimensional volume 2107, known to the those skilled in the art as motion-tracking.

With respect to the topmost graphical parent node 1002 within the process tree, two further branches respectively defined by nodes 1011, 1012 and 1013 to 1015 have to be processed before it pulls the input data and processes said data itself. A "sky" bitmap texture 2108 is thus generated by node 1011 which is subsequently colour-corrected at parent node 1012 using the same operational function as was invoked by colour-correction processing node 1005 to process the frame 2101.

Similarly, a computer-generated three-dimensional "clouds" model 2110 is generated by node 1013 utilising potentially the same operational function as was invoked by node 1007 to generate the "plane" three dimensional model. The three-dimensional model 2110 is subsequently lit (2111) at parent node 1014 using potentially the same lighting algorithm of the operational function called at node 1009. The lit (2111) three-dimensional model 2110 is subsequently motion-tracked (2112) at processing node 1015 utilising the same operational functions invoked by the processing node 1006 in order to eventually match the motion of the real and composited planes with the composited clouds.

Upon completing the processing 2112 at node 1015, the parent node 1002 is thus able to pull all of the input data 2101 to 2112 and process it in order to generate a composite frame 2113, within which two planes appear superimposed over a sky and clouds.

FIG. 22

Figure 22:
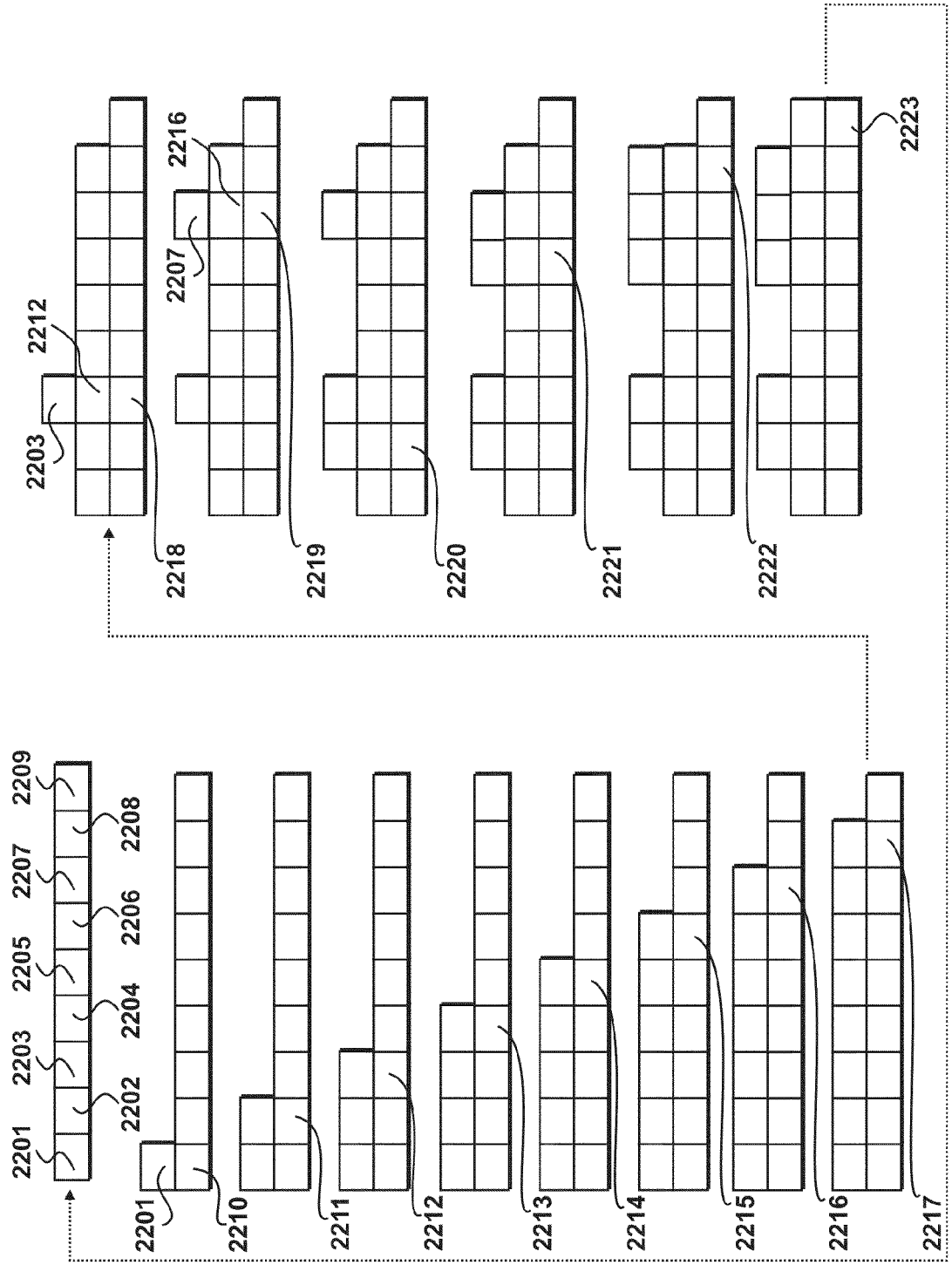
FIG. 22 provides a graphical representation of the data type register of the invention during the traversal shown in FIG. 21.

The evolution of the data definition register 805 of the parent node 1001 maintained by the process thread 812 during the traversal 1101 further detailed in FIG. 21 is graphically illustrated in FIG. 22.

For the purpose of clarity, the data definition register slots 2201 to 2209 are arranged in the same order as the sequential order in which parent and children nodes 1001 to 1015 are traversed. Thus, data definition register slot 2201 contains data definition and values relevant to the chroma-keying functionality of parent node 1002; data definition register slot 2202 contains data definition and default values relevant to motion tracking node 1006; data definition register slot 2203 contains data definition and default values relevant to colour-keying processing node 1005; slot 2204 contains data definition and default values pertaining to the frame-acquisition processing node 1004; slot 2205 contains data definition and values pertaining to the scaling processing node 1010; slot 2206 contains data definition and values pertaining to the artificial light processing node 1009; slot 2207 contains data definition and default values pertaining to the texture processing node 1008; slot 2208 contains data definition and default values relevant to the three dimensional modelling processing node 1007 and slot 2209 contains data definition and default values particularly relevant to the sound processing node 1003.

In accordance with the processing steps shown in FIG. 13, the traversal 1101 initially references the input data of the chroma-keying node 1002 at 2210, thereby pushing the default values 2201 up within the memory stack. The process thread next accesses the motion tracking node 1006, whereby motion tracking data 2211 is referenced within the data definition register 805, and the corresponding default values 2202 are also pushed within the memory stack, as previously. In accordance with the traversal previously detailed, colour correction actual data 2212, frame data 2213, scaling data 2214, computer generated artificial lighting 2215, bitmap texture data 2216 and three-dimensional model data 2217 are similarly sequentially referenced within the data definition register, whereby their respective default values are similarly pushed in their respective stacks.

When the process thread selects the colour correction processing node 1012, the question asked at step 1305 is answered positively and, in a manner similar to the previous registrations of actual data 2210 to 2217, colour control actual data 2212 is similarly pushed up in the colour control stack of the data definition register in order to register the new colour control data 2218 particularly relevant to colour correction processing node 2212. Thereafter, actual texture data 2216, actual motion tracking data 2211, actual artificial lighting data 2215 and actual three dimensional model data 2217 are respectively pushed by new texture data 2219, new motion tracking data 2220, new artificial lighting data 2221 and new three dimensional model data 2222.

Upon image keying processing node 1002 pulling all of the input data 2210 to 2222 in order to generate output composite frame 2113, the data definition register 805 is OR-ed, whereby actual input data 2210 to 2222 are unregistered and data definition register 805 is returned to its original configuration (2224).

FIG. 23

Figure 23:
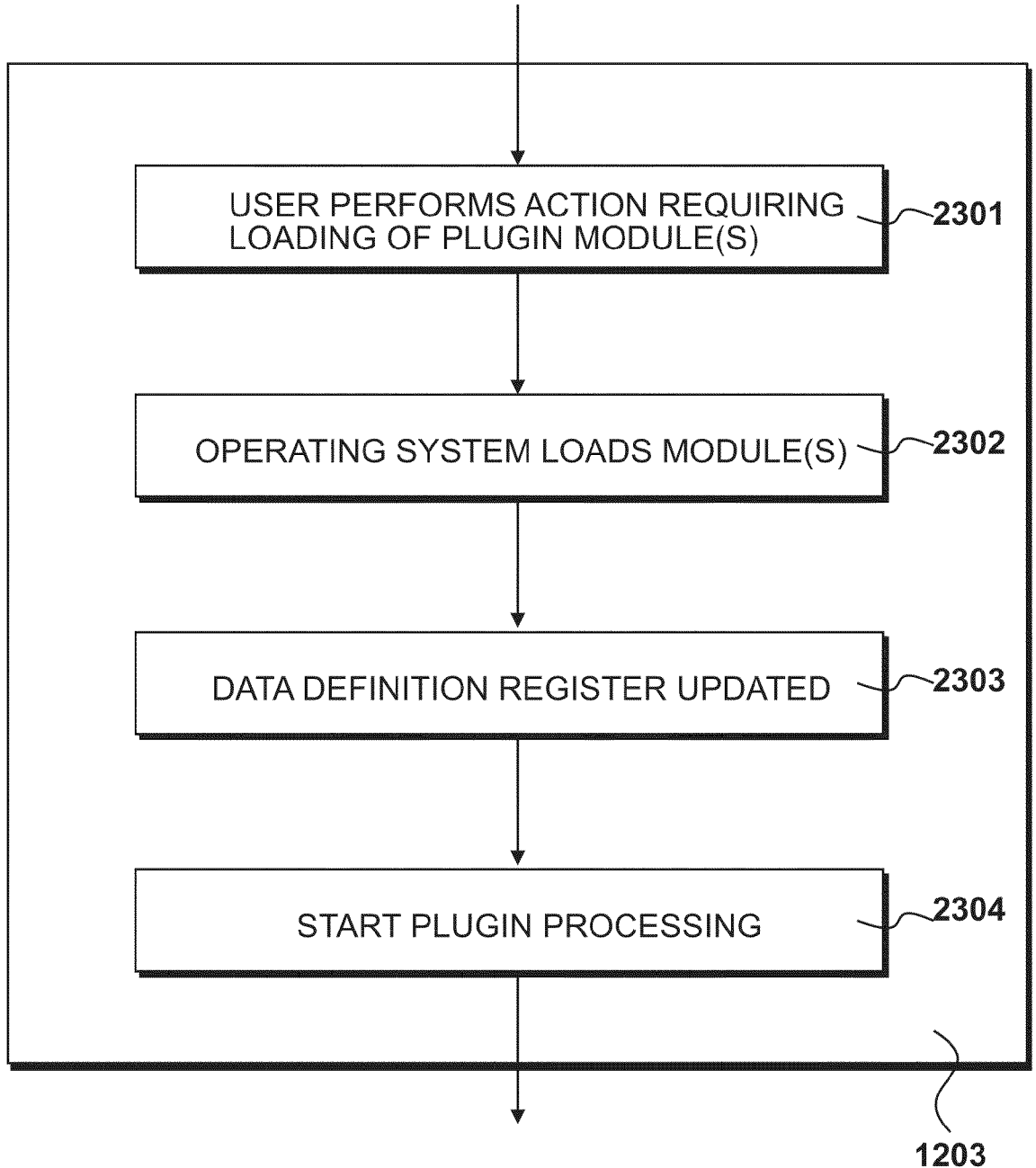
FIG. 23 details the processing steps performed by the operating system shown in FIG. 8 in order to load a new processing module at run-time.

It was previously explained that the data definition register 805 is a dynamic structure, as it must extend its functionality to occasions wherein the user of processing terminal 201 requires a new application module to be loaded at step 1205 when interacting with the application at step 304. Said step 1205 is further detailed in FIG. 23.

According to a preferred embodiment of the present invention, within the course of the interaction with application 802, the user eventually performs an action at step 2301 which requires the loading of one or a plurality of processing modules which were not initialised at step 303. Upon performing this specific action, the operating system 801 loads the new processing modules in accordance with step 701 at step 2302, whereby the static objects of said new modules are declared and the dependencies and context thereof registered in accordance with processing steps 702 to 707. If the operational functions of the new modules are configured to process data, the definition of which is already registered within the data definition register 805, there is no need to re-register an identical data definition and default values thereof within the register. If, however, the operational functions of the new modules are configured to process data, the definition of which does not yet exist within the register, then in accordance with steps 704 to 706, the data definition register slots 2301 to 905 are incremented by a unit, eventually resulting in the data definition register being updated at step 2209.

The processing of the new module eventually starts at step 2304 when the initialisation process is complete.

FIG. 24

Figure 24:
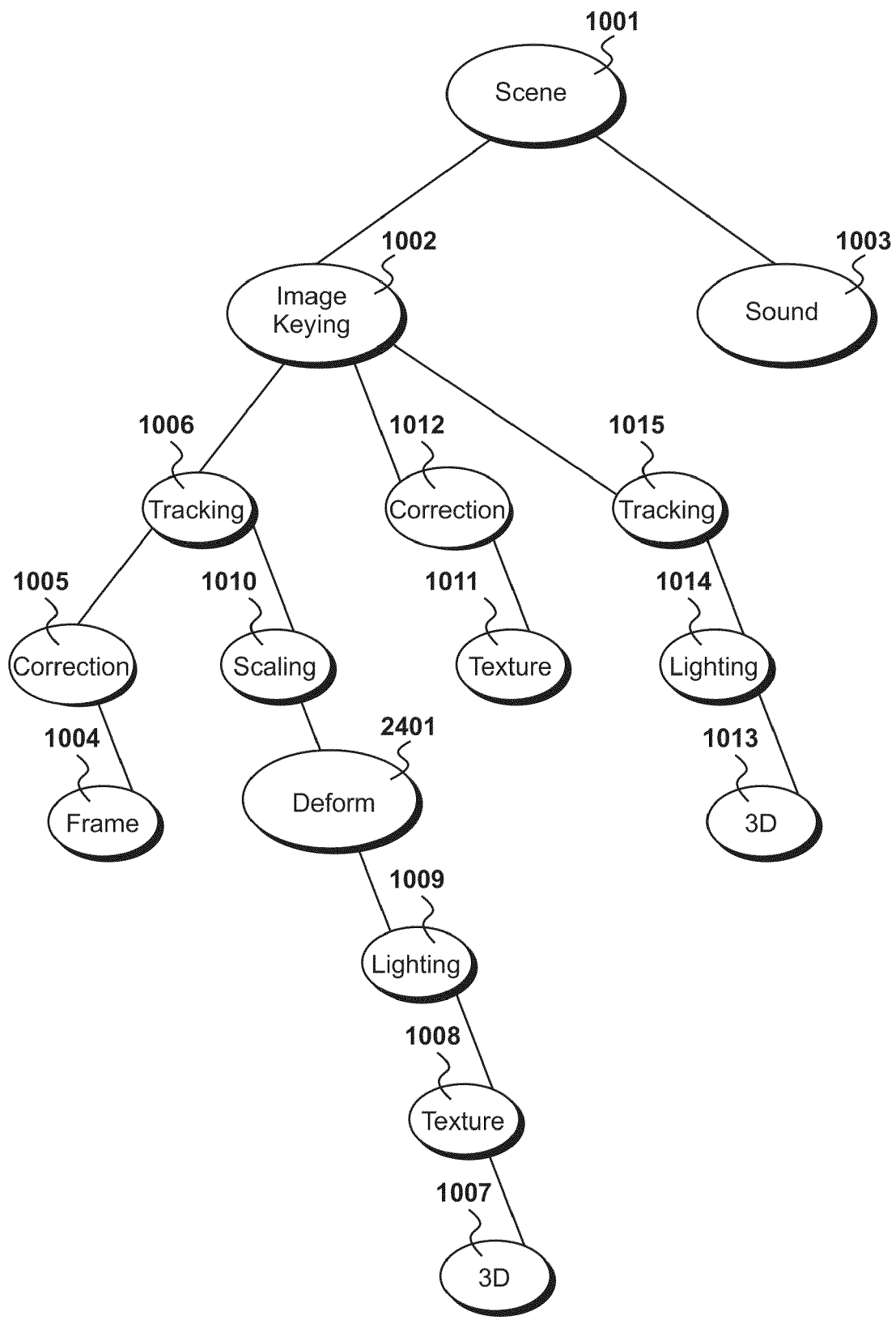
FIG. 24 shows the process tree detailed in FIG. 10 including a new processing module as a result of the processing steps shown in FIG. 23.

The process tree detailed in FIG. 10 is shown in FIG. 24, including a new processing node 2401, the operational function of which is to apply a deformation matrix to the artificially lit and textured three dimensional model 2103 to simulate a heat haze effect.

As the first traversal 1101 of the process tree shown in FIG. 10 is completed according to the invention, the user can ascertain from the output composite frame 2113 that the three-dimensional model-based plane within the frame 2113 appears behind the real plane from frame 2101 and thus, in order to improve the realism of the shot, should appear at least partially deformed by the heat haze of the exhaust of the real plane. In the example, application 802 does not include any application module, the operational function of which allows the user to implement this effect within the composited frame 2113. The user of terminal 201 thus connects to the internet 105 by means of a modem connection (not shown) to the ISP 106 in order to identify then download an application module which features this particular functionality from the engineer's terminal 112.

Upon completing said download operation and initialising a processing module hence referred to as a deform module 2401 according to step 1205, the user of terminal 201 can implement a deform node 2401 as a child of the scaling node 1010 and the new parent of nodes 1007, 1008 and 1009.

In effect, the scaling operational function invoked by the scaling node 1010 must now process a deformed (2401), lit (2105) and textured (2104) three dimensional model 2103. As a result of the concurrent processing accomplished by the process thread 812, continuation thread 814 and cache thread 813, the input data of the deform node 2401 is registered within the data definition register 805 and the default data value is zero, resulting in a non-deformation of the data submitted to said deform node 2401. Therefore, even if the deformation operational function, which is the specific functionality of the application module 2401 downloaded by the user, is not properly implemented or malfunctions, the scaling node 1010 is still able to process a non-deformed, lit and textured three dimensional model.

FIG. 25

Figure 25:
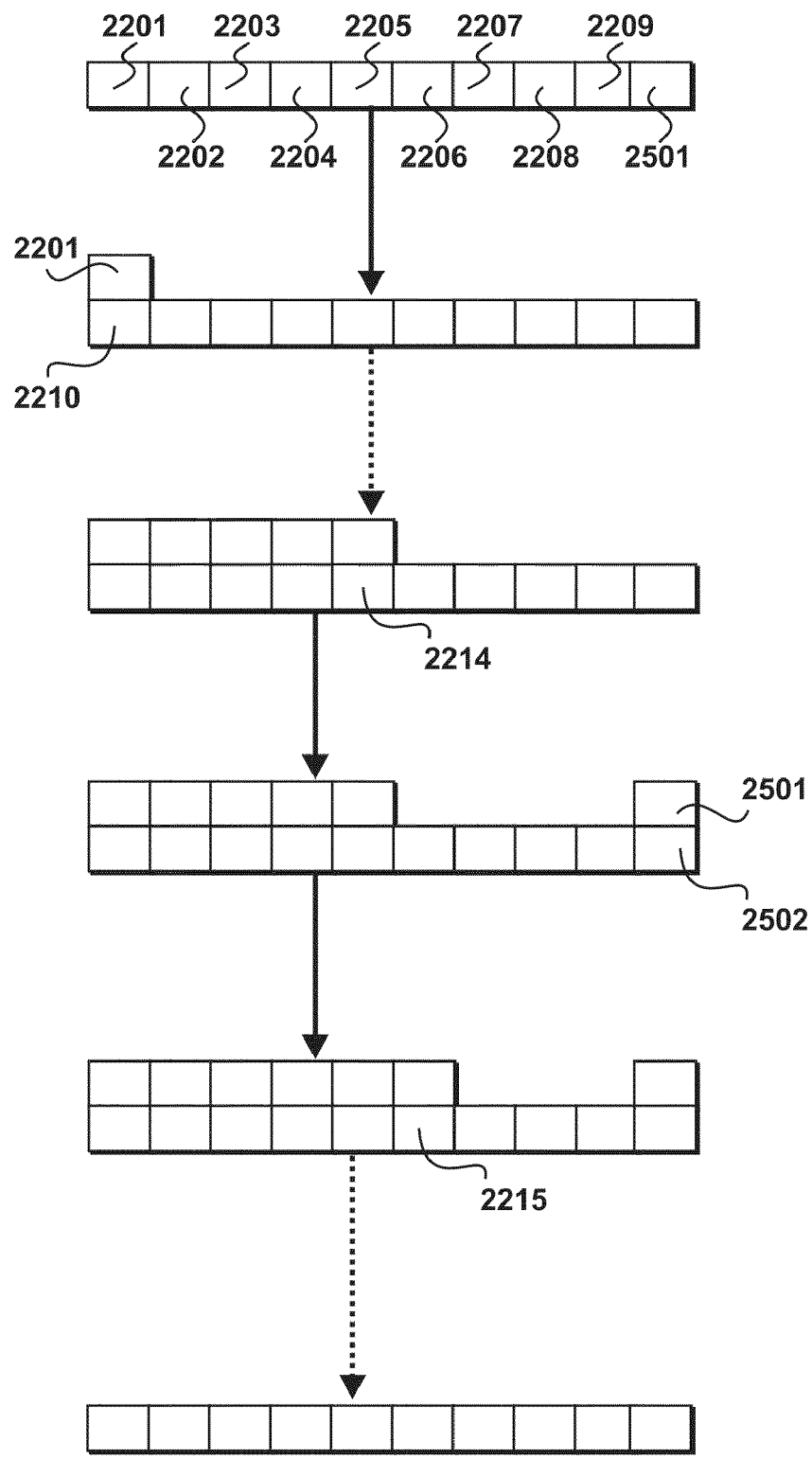
FIG. 25 shows the data type register of FIG. 22 altered by the processing of the process tree shown in FIG. 24.

The evolution of the data definition register 805 during the traversal 1101 shown in FIG. 22 is graphically represented in FIG. 25, including a new data definition register slot 2501 including a default value of zero instantiated when the deform processing module 2401 is initialised.

At the onset of the next traversal of the process tree, the data definition register 805 is shown which includes an additional slot 2501 implemented as a result of the incrementation of step 505. Said slot 2501 defines the "deform" data and a default value of zero, as previously explained. As the traversal progresses according to the detailed description provided at FIG. 22, the process thread eventually selects the deform node 2401 at step 1301, whereby the node's actual data 2502 is registered to the data definition register, thus pushing the data definition and value up in this stack irrespective of the fact that the deform slot 2501 is not contiguous with the respective data definition register slots of the previous node or the subsequent node.

The traversal subsequently progresses, whereby the process thread selects the lighting node 1009 and its actual data 2215 is registered within the data definition register and so on and so forth until such time as the data definition register is OR-ed at 2503.

What is claimed is:

1. A computer implemented method for traversing a process tree in a digital video editing system, the method comprising:
   (a) loading the process tree into the digital video editing system, wherein:
      (i) the process tree comprises one or more parent nodes and one or more child nodes;
      (ii) each of the one or more parent nodes is dependent on output data from at least one of the one or more child nodes;
      (iii) each of the one or more parent nodes and each of the one or more child nodes represents a digital video processing task to be performed during a traversal of the process tree to generate a digital video output;
   (b) each of the one or more parent nodes declaring a corresponding data definition and corresponding data default values, wherein the data definition defines a structure of the output data from a dependent child node used by the corresponding parent node;
   (c) traversing the process tree, to generate the digital video output, by processing each of the one or more parent nodes and each of the one or more child nodes in logical order, wherein:
      (i) for each parent node being processed, determining if the data definition for the output data received from a dependent child node is compatible with the data definition declared for that parent node; and
      (ii) when the data definition is incompatible, the parent node utilizing the data default values.

2. The method of traversing the process tree of claim 1, wherein each of the one or more parent nodes stores said corresponding data definition and corresponding data default values within a data type register.

3. An apparatus for traversing a process tree in a digital video editing system comprising:
   (a) a computer having a memory;
   (b) an application executing on the computer, wherein the application is configured to:
      (i) load the process tree into the digital video editing system, wherein:
         (1) the process tree comprises one or more parent nodes and one or more child nodes;
         (2) each of the one or more parent nodes is dependent on output data from at least one of the one or more child nodes;
         (3) each of the one or more parent nodes and each of the one or more child nodes represents a digital video processing task to be performed during a traversal of the process tree to generate a digital video output;
      (ii) have each of the one or more parent nodes declare a corresponding data definition and corresponding data default values, wherein the data definition defines a structure of the output data from a dependent child node used by the corresponding parent node;
      (iii) traverse the process tree, to generate the digital video output, by processing each of the one or more parent nodes and each of the one or more child nodes in logical order, wherein:
         (1) for each parent node being processed, determining if the data definition for the output data received from a dependent child node is compatible with the data definition declared for that parent node; and
         (2) when the data definition is incompatible, the parent node utilizing the data default values.

4. The apparatus of traversing the process tree of claim 3, wherein each of the one or more parent nodes stores said corresponding data definition and corresponding data default values within a data type register.

5. An article of manufacture comprising a program storage device readable by a computer, tangibly embodying at least one program of instructions executable by the computer to perform method steps of traversing a process tree in a digital video editing system, the method steps comprising the steps of:
   (a) loading the process tree into the digital video editing system, wherein:
      (i) the process tree comprises one or more parent nodes and one or more child nodes;

(ii) each of the one or more parent nodes is dependent on output data from at least one of the one or more child nodes;

(iii) each of the one or more parent nodes and each of the one or more child nodes represents a digital video processing task to be performed during a traversal of the process tree to generate a digital video output;

(b) each of the one or more parent nodes declaring a corresponding data definition and corresponding data default values, wherein the data definition defines a structure of the output data from a dependent child node used by the corresponding parent node;

(c) traversing the process tree, to generate the digital video output, by processing each of the one or more parent nodes and each of the one or more child nodes in logical order, wherein:

(i) for each parent node being processed, determining if the data definition for the output data received from a dependent child node is compatible with the data definition declared for that parent node; and (ii) when the data definition is incompatible, the parent node utilizing the data default values.

6. The article of manufacture of claim 5, wherein each of the one or more parent nodes stores said corresponding data definition and corresponding data default values within a data type register.

\* \* \* \* \*